(12) United States Patent
Miyatake et al.

(10) Patent No.: US 10,947,339 B2
(45) Date of Patent: Mar. 16, 2021

(54) ANION EXCHANGE RESIN, METHOD FOR PRODUCING THEREOF, ELECTROLYTE MEMBRANE FOR FUEL CELL, BINDER FOR FORMING ELECTRODE CATALYST LAYER, FUEL CELL ELECTRODE CATALYST LAYER AND FUEL CELL

(71) Applicants: University of Yamanashi, Kofu (JP); Takahata Precision Co., Ltd., Fuefuki (JP)

(72) Inventors: Kenji Miyatake, Kofu (JP); Junpei Miyake, Kofu (JP); Hideaki Ono, Kofu (JP); Manai Shimada, Fuefuki (JP); Naoki Yokota, Fuefuki (JP); Natsumi Yoshimura, Fuefuki (JP); Koichiro Asazawa, Shiga (JP); Eriko Nishino, Shiga (JP)

(73) Assignees: UNIVERSITY OF YAMANASHI, Kofu (JP); TAKAHATA PRECISION CO., LTD., Fuefuki (JP)

( * ) Notice: Subject to any disclaimer, the term of this patent is extended or adjusted under 35 U.S.C. 154(b) by 232 days.

(21) Appl. No.: 15/762,085

(22) PCT Filed: Sep. 20, 2016

(86) PCT No.: PCT/JP2016/077610
§ 371 (c)(1),
(2) Date: Mar. 21, 2018

(87) PCT Pub. No.: WO2017/051786
PCT Pub. Date: Mar. 30, 2017

(65) Prior Publication Data
US 2018/0265626 A1  Sep. 20, 2018

(30) Foreign Application Priority Data
Sep. 22, 2015 (JP) .............................. JP2015-186152

(51) Int. Cl.
*C08G 61/12* (2006.01)
*C08G 65/40* (2006.01)
(Continued)

(52) U.S. Cl.
CPC ............. *C08G 61/12* (2013.01); *C08G 65/40* (2013.01); *C08G 65/4006* (2013.01);
(Continued)

(58) Field of Classification Search
CPC .... C08G 61/12; C08G 75/23; C08G 65/4006; C08G 65/4056; C08G 65/48; C08G 65/40;
(Continued)

(56) References Cited

U.S. PATENT DOCUMENTS

2002/0127474 A1* 9/2002 Fleischer ........... B01D 67/0093
429/309
2012/0238648 A1* 9/2012 Zhou ........................ B01J 49/00
521/27

FOREIGN PATENT DOCUMENTS

JP  2008-171620 A  7/2008
JP  2011-26592 A   2/2011
(Continued)

OTHER PUBLICATIONS

Zhang et al. J. Membr. Sci. 368 (2011) 246-253) (Year: 2011).*
(Continued)

*Primary Examiner* — Lisa S Park
(74) *Attorney, Agent, or Firm* — Masuvalley & Partners

(57) ABSTRACT

Provided are an anion exchange resin being capable of producing an electrolyte membrane for a fuel cell, a binder for forming an electrode catalyst layer and a fuel cell electrode catalyst layer, which have an improved physical property (anion conductivity); a method for producing thereof; an electrolyte membrane for a fuel cell, a binder for
(Continued)

forming an electrode catalyst layer and a fuel cell electrode catalyst layer produced from the anion exchange resin; and a fuel cell having the electrolyte membrane or the electrode catalyst layer.

For example, the anion exchange resin is obtained by reacting a hydrophobic monomer with an aminoalkyl group-containing monomer, in which the hydrophobic monomer is composed of one aromatic ring or a plurality of aromatic rings to which two halogen atoms are bonded, and the aminoalkyl group-containing monomer is composed of one aromatic ring or a plurality of aromatic rings to which two halogen atoms are bonded and an aminoalkyl group is introduced; and by quaternizing the amino group. In the anion exchange resin, a divalent hydrophobic group formed by the residue of the hydrophobic monomer, and a divalent hydrophilic group formed by the residue of the quaternized aminoalkyl group-containing monomer are bonded via direct bond.

1 Claim, 2 Drawing Sheets

(51) Int. Cl.
H01B 1/12 (2006.01)
H01M 4/86 (2006.01)
H01M 8/0202 (2016.01)
H01M 8/06 (2016.01)
H01M 8/10 (2016.01)
C08G 75/23 (2006.01)
H01M 8/103 (2016.01)
C08G 65/48 (2006.01)
C08J 5/22 (2006.01)

(52) U.S. Cl.
CPC ......... *C08G 65/4056* (2013.01); *C08G 65/48* (2013.01); *C08G 75/23* (2013.01); *C08J 5/2262* (2013.01); *H01B 1/12* (2013.01); *H01M 4/86* (2013.01); *H01M 8/0202* (2013.01); *H01M 8/06* (2013.01); *H01M 8/10* (2013.01); *H01M 8/103* (2013.01); *C08G 2261/143* (2013.01); *C08G 2261/146* (2013.01); *C08G 2261/312* (2013.01); *C08G 2261/344* (2013.01); *C08G 2261/354* (2013.01); *C08G 2261/412* (2013.01); *C08G 2261/516* (2013.01); *C08G 2261/72* (2013.01); *C08J 2371/10* (2013.01); *C08J 2381/06* (2013.01)

(58) Field of Classification Search
CPC ........ C08G 2261/516; C08G 2261/146; C08G 2261/412; C08G 2261/72; C08G 2261/143; C08G 2261/312; C08G 2261/344; C08G 2261/354; H01M 8/103; H01M 8/0202; H01M 8/06; H01M 8/10; H01M 4/86; H01B 1/12; C08J 2381/06; C08J 2371/10; C08J 5/2262
See application file for complete search history.

(56) References Cited

FOREIGN PATENT DOCUMENTS

| | | |
|---|---|---|
| JP | 2012-49111 A | 3/2012 |
| JP | 2013-505825 A | 2/2013 |
| JP | 2013-047309 A | 3/2013 |
| JP | 2014-84349 A | 5/2014 |
| WO | WO2011/099213 A1 | 8/2011 |

OTHER PUBLICATIONS

WIPO, Japan International Search Authority, International Search Report and Written Opinion dated Nov. 22, 2016 in International Patent Application No. PCT/JP2016/077610, 9 pages.

* cited by examiner

ANION EXCHANGE RESIN, METHOD FOR PRODUCING THEREOF, ELECTROLYTE MEMBRANE FOR FUEL CELL, BINDER FOR FORMING ELECTRODE CATALYST LAYER, FUEL CELL ELECTRODE CATALYST LAYER AND FUEL CELL

RELATED APPLICATIONS

This application is the U.S. National Phase of and claims priority to International Patent Application No. PCT/JP2016/077610, International Filing Date Sep. 20, 2016, entitled Anion Exchange Resin And Method For Producing Same, Electrolyte Membrane For Fuel Cells, Binder For Forming Electrode Catalyst Layers, Battery Electrode Catalyst Layer, And Fuel Cell; which claims priority to Japanese Application No. 2015-186152 filed Sep. 22, 2015; both of which are incorporated herein by reference in their entireties.

TECHNICAL FIELD

The present invention relates to an anion exchange resin, a method for producing thereof, an electrolyte membrane for a fuel cell, a binder for forming an electrode catalyst layer, a fuel cell electrode catalyst layer, and a fuel cell.

BACKGROUND ART

It is known that an anion exchange resin comprises: divalent hydrophobic groups being composed of a plurality of aromatic rings which are bonded to each other via a divalent saturated hydrocarbon group; divalent binding groups being composed of one aromatic ring, or being composed of a plurality of aromatic rings which are bonded to each other via carbon-carbon bond (direct bond); and divalent hydrophilic groups having a plurality of aromatic rings which are bonded to each other via a divalent saturated hydrocarbon group to which an aromatic ring having an anion exchange group is bonded via carbon-carbon bond; wherein the divalent hydrophobic groups and the divalent binding groups are bonded repeatedly via ether bond to form a hydrophobic unit; wherein the divalent hydrophilic group and the divalent binding group are bonded repeatedly via ether bond to form a hydrophilic unit; and wherein the hydrophobic unit and the hydrophilic unit are bonded via ether bond (Patent Document 1).

PATENT DOCUMENT

Patent Document 1: JP 2013-47309 A

SUMMARY OF THE INVENTION

Problem to be Solved by the Invention

However, there is a problem that the anion exchange resin described in Patent Document 1 has an insufficient physical property (anion conductivity). In the method for producing the anion exchange resin described in Patent Document 1, a precursor polymer for the anion exchange resin is produced and then an anion exchange resin group is introduced. Therefore, the structure expected to have an improved property could not be selected in some cases because the structure of the moiety (a hydrophobic moiety), to which the anion exchange group is not introduced, is limited because of the reactivity.

Accordingly, an object of the present invention is to provide an anion exchange resin being capable of producing an electrolyte membrane for a fuel cell, a binder for forming an electrode catalyst layer and a fuel cell electrode catalyst layer, which have an improved physical property (anion conductivity); a method for producing thereof; an electrolyte membrane for a fuel cell and a binder for forming an electrode catalyst layer produced from the anion exchange resin; a fuel cell electrode catalyst layer produced by the binder for forming the electrode catalyst layer; and a fuel cell having the electrolyte membrane or the electrode catalyst layer.

Means of Solving the Problem

In order to solve the problem, the anion exchange resin of the present invention is produced by:

(A) preparing a hydrophobic monomer or a hydrophobic oligomer,
wherein the hydrophobic monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, and wherein two halogen atoms, pseudohalides or boronate groups are bonded to the aromatic ring(s); and
wherein the hydrophobic oligomer is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, wherein the plurality of aromatic rings are bonded repeatedly via a divalent hydrocarbon group, a divalent silicon-containing group, a divalent nitrogen-containing group, a divalent phosphorus-containing group, a divalent oxygen-containing group, a divalent sulfur-containing group, or direct bond, and wherein two halogen atoms, pseudohalides or boronate groups are bonded to the aromatic rings at both terminals;

(B) preparing an aminoalkyl group-containing monomer, wherein the aminoalkyl group-containing monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, and wherein two halogen atoms, pseudohalides or boronate groups are bonded to the aromatic ring(s), and wherein at least one aromatic rings has an aminoalkyl group;

(C) reacting the hydrophobic monomer or the hydrophobic oligomer with the aminoalkyl group-containing monomer to synthesize a polymer; and (D) quaternizing the amino group in the polymer;
wherein the residue of the hydrophobic monomer or the hydrophobic oligomer forms a divalent hydrophobic group;
wherein the quaternized amino group forms an anion exchange group;
wherein the residue of the quaternized aminoalkyl group-containing monomer forms a divalent hydrophilic group; and wherein the divalent hydrophobic group and the divalent hydrophilic group are bonded via direct bond.

In the anion exchange resin of the present invention, the hydrophobic group comprises:

a bisphenol residue which may be substituted with a halogen atom, a pseudohalide or an alkyl group, as shown in the following formula (2); and/or an o-, m- or p-phenylene group which may be substituted with a halogen atom, a pseudohalide or an alkyl group, as shown in the following formula (2').

[Chemical Formula 1]

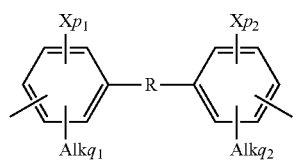

(2)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide; each Alk is the same or different and represents an alkyl group; each X is the same or different and represents a halogen atom or a pseudohalide; and $p_1$, $p_2$, $q_1$, and $q_2$ are the same or different and represent an integer of 0 to 4.).

[Chemical Formula 2]

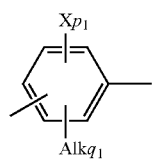

(2')

(In the formula, Alk represents an alkyl group; X represents a halogen atom or a pseudohalide; and $p_1$ and $q_1$ are the same or different and represent an integer of 0 to 4.)

In the anion exchange resin of the present invention, the hydrophilic group group suitably comprises:

a bisphenol residue which is substituted with a substituent group having the anion exchange group and may be substituted with an alkyl group, as shown in the following formula (3); and/or an o-, m- or p-phenylene group substituted with a substituent group having the anion exchange group, as shown in the following formula (3').

[Chemical Formula 3]

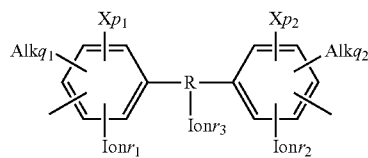

(3)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a substituent group having the anion exchange group; each Alk is the same or different and represents an alkyl group; each X is the same or different and represents a halogen atom or a pseudohalide; each Ion is the same or different and represents a substituent group having an anion exchange group; $p_1$, $p_2$, $q_1$, and $q_2$ are the same or different and represent an integer of 0 to 4; $r_1$, $r_2$, and $r_3$ are the same or different and represent an integer of 0 to 4, and at least one of $r_1$, $r_2$, and $r_3$ represents 1 or more.)

[Chemical Formula 4]

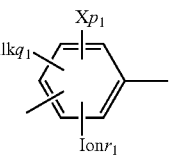

(3')

(In the formula, Alk represents an alkyl group; X represents a halogen atom or a pseudohalide; Ion represents a substituent group having an anion exchange group; and $p_1$ and $q_1$ are represent an integer of 0 to 4; and $r_1$ represents an integer of 1 to 4.)

In order to solve the problem, the electrolyte membrane for the fuel cell of the present invention comprises the anion exchange resin as described above.

In order to solve the problem, the binder for forming the electrode catalyst layer of the present invention comprises the anion exchange resin as described above.

In order to solve the problem, the fuel cell electrode catalyst layer of the present invention comprises the binder for forming the electrode catalyst layer as described above.

In order to solve the problem, the fuel cell of the present invention comprises:

an electrolyte membrane comprising the anion exchange resin as described above;

a fuel side electrode to which a hydrogen-containing fuel is supplied and an oxygen side electrode to which oxygen and air are supplied, the fuel side electrode and the oxygen side electrode being oppositely disposed by interposing the electrolyte membrane.

In the fuel cell of the present invention, the hydrogen-containing fuel is suitably hydrogen, an alcohol, or hydrazine.

In order to solve the problem, the method for producing the anion exchange resin of the present invention comprises:

(A) preparing a hydrophobic monomer or a hydrophobic oligomer, wherein the hydrophobic monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, wherein two halogen atoms, pseudohalides or boronate groups are bonded to the aromatic ring(s); and wherein the oligomer is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, wherein the plurality of aromatic rings are bonded repeatedly via a divalent hydrocarbon group, a divalent silicon-containing group, a divalent nitrogen-containing group, a divalent phosphorus-containing group, a divalent oxygen-containing group, a divalent sulfur-containing group, or direct bond, and wherein two halogen atoms, pseudohalides or boronate groups are bonded to the aromatic rings at both terminals;

(B) preparing an aminoalkyl group-containing monomer, wherein the aminoalkyl group-containing monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, and wherein two halogen atoms, pseudohalides or boronate groups are bonded to the aromatic ring(s), and wherein at least one aromatic rings has an aminoalkyl group;

(C) reacting the hydrophobic monomer or the hydrophobic oligomer with the aminoalkyl group-containing monomer to synthesize a polymer; and (D) quaternizing the amino group in the polymer; and in the anion exchange resin, wherein the residue of the hydrophobic monomer or the hydrophobic oligomer forms a divalent hydrophobic group;

wherein the quaternized amino group forms an anion exchange group;

wherein the residue of the quaternized aminoalkyl group-containing monomer forms a divalent hydrophilic group; and wherein the divalent hydrophobic group and the divalent hydrophilic group are bonded via direct bond.

Effect of the Invention

According to the present invention, the structure of the hydrophobic moiety having no anion exchange group can be widely selected. Therefore, the structure having an improved physical property (conductivity) and improved chemical stability can be selected as the structure of the hydrophobic moiety regardless of whether the reaction activity is high or not. According to the method as described above, a precursor group of the ion exchange group can be introduced before the polymerization, and thereby the position and the amount of the precursor group introduced can be easily controlled. Therefore, an anion exchange resin being capable of producing an electrolyte membrane for a fuel cell, a binder for forming an electrode catalyst layer and a fuel cell electrode catalyst layer, which have an improved physical property (anion conductivity); a method for producing thereof; an electrolyte membrane for a fuel cell and a binder for forming an electrode catalyst layer produced from the anion exchange resin; a fuel cell electrode catalyst layer produced by the binder for forming the electrode catalyst; and a fuel cell having the electrolyte membrane or the electrode catalyst layer are provided.

MODE FOR CARRYING OUT THE INVENTION

Figure 1:
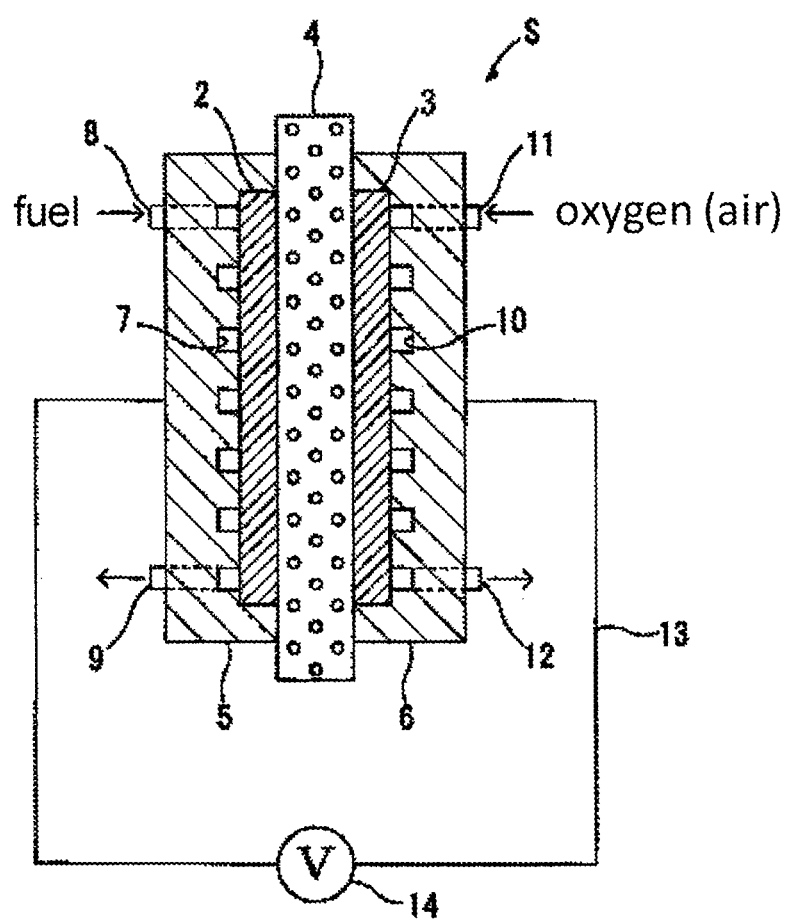
FIG. 1 is a schematic configuration diagram showing an embodiment of the fuel cell of the present invention.

The anion exchange resin of the present invention is composed of a divalent hydrophobic group and a divalent hydrophilic group.

In the anion exchange resin of the present invention, the divalent hydrophobic group is formed by the residue of a hydrophobic monomer, which is composed of one aromatic ring, or is composed of a plurality of (two or more, and preferably two) aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, in which two halogen atoms, pseudohalides or boronate groups are bonded to the aromatic ring(s). Alternatively, the divalent hydrophobic group is produced by the residue of a hydrophobic oligomer, which is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, in which the plurality of aromatic rings are bonded repeatedly via a divalent hydrocarbon group, a divalent silicon-containing group, a divalent nitrogen-containing group, a divalent phosphorus-containing group, a divalent oxygen-containing group, a divalent sulfur-containing group, or direct bond, and in which two halogen atoms, pseudohalides or boronate groups are bonded to the aromatic rings at both terminals.

Examples of the aromatic ring include mono- or polyaromatic hydrocarbons having carbon atoms of 6 to 14 such as benzene ring, naphthalene ring, indene ring, azulene ring, fluorene ring, anthracene ring, and phenanthrene ring; and heterocyclic compounds such as azole, oxole, thiophene, oxazole, thiazole, and pyridine.

Preferred examples of the aromatic ring include monoaromatic hydrocarbons having carbon atoms of 6 to 14. More preferred examples of the aromatic ring include benzene ring.

The aromatic ring may be substituted with a substituent group such as a halogen atom, an alkyl group, a pseudohalide, or a boronate group, as needed. Examples of the pseudohalide include trifluoromethyl group, —CN, —NC, —OCN, —NCO, —ONC, —SCN, —NCS, —SeCN, —NCSe, —TeCN, —NCTe, and —$N_3$.

When the aromatic ring is substituted with a substituent group such as a halogen atom, an alkyl group, a pseudohalide, or a boronate group, the number and the position of the substituent group such as a halogen atom, an alkyl group, a pseudohalide, or a boronate group is suitably selected depending on the purpose and application.

In this regard, at least two halogen atoms, pseudohalides or boronate groups are bonded to the aromatic ring(s) in the hydrophobic monomer or the hydrophobic oligomer. If a hydrophobic monomer composed of one aromatic ring is used, the binding position of the two halogen atoms, pseudohalides or boronate groups is on the aromatic ring. If a hydrophobic monomer composed of two aromatic rings is used, the binding position is on each of the aromatic rings. If a hydrophobic monomer composed of three aromatic rings or a hydrophobic oligomer is used, the binding position is on the aromatic rings at both terminals.

The divalent hydrophobic group is composed of the residue by excluding two halogen atoms, pseudohalides or boronate groups which are bonded to the aromatic ring(s) from the hydrophobic monomer or the hydrophobic oligomer.

More specific examples of the aromatic ring substituted with a halogen atom include benzene rings substituted with 1 to 4 halogen atoms (for example, benzene ring substituted with 1 to 4 fluorine atoms, benzene ring substituted with 1 to 4 chlorine atoms, benzene ring substituted with 1 to 4 bromine atoms, and benzene ring substituted with 1 to 4 iodine atoms, in which 1 to 4 halogen atoms may be all the same or different).

Examples of the divalent hydrophilic group include divalent saturated hydrocarbon groups having carbon atoms of 1 to 20 such as methylene (—$CH_2$—), ethylene, propylene, isopropylene (—$C(CH_3)_2$—), butylene, isobutylene, sec-butylene, pentylene (pentene), isopentylene, sec-pentylene, hexylene (hexamethylene), 3-methylpentene, heptylene, octylene, 2-ethylhexylene, nonylene, decylene, isodecylene, dodecylene, tetradecylene, hexadecylene, and octadecylene.

Preferred examples of the divalent hydrocarbon group include divalent saturated hydrocarbon groups having carbon atoms of 1 to 3. More specific examples of the divalent hydrocarbon group include methylene (—$CH_2$—), ethylene, propylene, isopropylene (—$C(CH_3)_2$—). More preferred examples of the divalent hydrocarbon group include methylene (—$CH_2$—) and isopropylene (—$C(CH_3)_2$—). Particularly preferred examples of the divalent hydrocarbon group include isopropylene (—$C(CH_3)_2$—).

The divalent hydrocarbon group may be substituted with a monovalent residue in the aromatic ring as described above.

Preferred examples of the divalent hydrocarbon group include biphenylene groups which may be substituted with a halogen atom, a pseudohalide or an alkyl group, as shown in the following formula (2); or an o-, m- or p-phenylene groups which may be substituted with a halogen atom, a pseudohalide or an alkyl group, as shown in the following formula (2').

[Chemical Formula 5]

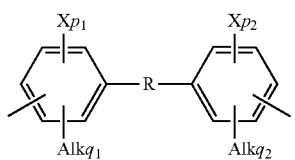

(2)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide; each Alk is the same or different and represents an alkyl group; each X is the same or different and represents a halogen atom or a pseudohalide; and $p_1$, $p_2$, $q_1$, and $q_2$ are the same or different and represent an integer of 0 to 4.)

[Chemical Formula 6]

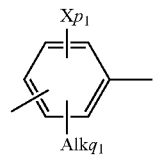

(2')

(In the formula, Alk represents an alkyl group; X represents a halogen atom or a pseudohalide; and $p_1$ and $q_1$ are the same or different and represent an integer of 0 to 4.)

In the above formula (2), R represents a hydrocarbon group, a silicon-containing group, a nitrogen-containing group, a phosphorus-containing group, an oxygen-containing group, a sulfur-containing group, an aromatic group, or direct bond. Examples of the aromatic group include divalent residues in the aromatic rings as described above. Preferred examples of the aromatic group include m-phenylene group and fluorenyl group.

In the above formula (2), each Alk is the same or different and represents an alkyl group. Examples of the alkyl group include alkyl groups having carbon atoms of 1 to 20 such as methyl group, ethyl group, propyl group, i-propyl group, butyl group, i-butyl group, sec-butyl group, t-butyl group, pentyl group, hexyl group, heptyl group, and octyl group; and cycloalkyl groups having carbon atoms of 1 to 20 such as cyclopropyl group, cyclobutyl group, cyclopentyl group, cyclohexyl group, cycloheptyl group, and cyclooctyl group.

In the above formula (2), each X is the same or different and represents a halogen atom or a pseudohalide as described above.

In the above formula (2), $p_1$ and $p_2$ are the same or different and represent an integer of 0 to 4. In view of the chemical stability, at least one of $p_1$ and $p_2$ preferably represents an integer of 1 to 4, and both $p_1$ and $p_2$ particularly preferably represent 4. In the above formula (2), $q_1$ and $q_2$ are the same or different and represent an integer of 0 to 4.

In the above formula (2'), X represents a halogen atom or a pseudohalide; $p_1$ represents an integer of 0 to 4, preferably represents 4. Examples of the pseudohalide include the pseudohalides as described above.

In the above formula (2'), Alk represents an alkyl group as described above; $q_1$ represents an integer of 0 to 4.

Particularly preferred examples of the hydrophobic group include the groups as shown in the following formula (4), the following formula (4'), and the following formula (4").

[Chemical Formula 7]

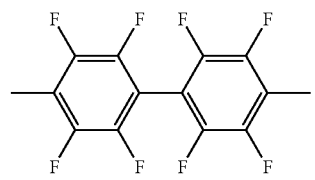

(4)

[Chemical Formula 8]

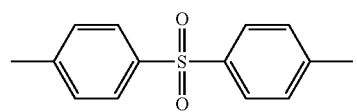

(4')

-continued

[Chemical Formula 9]

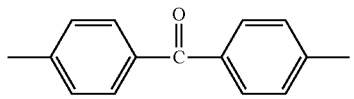

(4″)

A divalent binding group as shown in the following formula (1) can be introduced to the hydrophobic group.

[Chemical Formula 10]

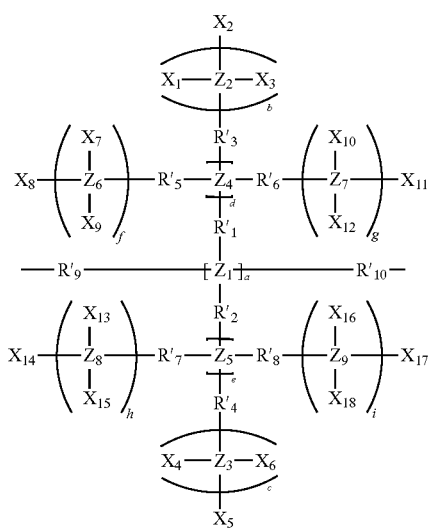

(1)

(In the formula, $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; and b, c, d, e, f, g, h, and i are the same or different and represent an integer of 0 or more.)

In the above formula (1), $Z_1$ to $Z_9$ are the same or different and represent carbon atom or silicon atom, and are preferably carbon atom.

In the above formula (1), $R'_1$ to $R'_{10}$ are the same or different and represent a silicon-containing group, a nitrogen-containing group, a phosphorus-containing group, an oxygen-containing group, a sulfur-containing group, or direct bond, and are preferably direct bond.

In the above formula (1), $X_1$ to $X_{18}$ are the same or different and represent a halogen atom or a pseudohalide, which is described above, or hydrogen atom, preferably a halogen atom or hydrogen atom, and more preferably fluorine atom.

In the above formula (1), a represents an integer of 1 or more, preferably an integer of 1 to 20, and more preferably an integer of 4 to 8.

In the above formula (1), b, c, d, e, f, g, h, and i are the same or different and represent an integer of 0 or more, preferably an integer of 0 to 10, more preferably an integer of 0 to 3, and still more preferably 0 or 1.

Preferred examples of the divalent binding group include the groups having the following structure.

[Chemical Formula 11]

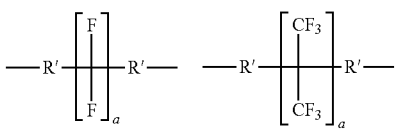

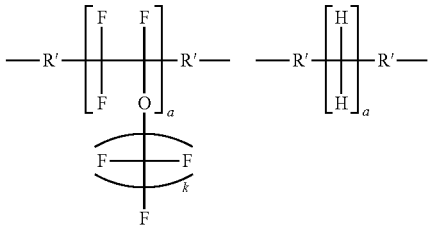

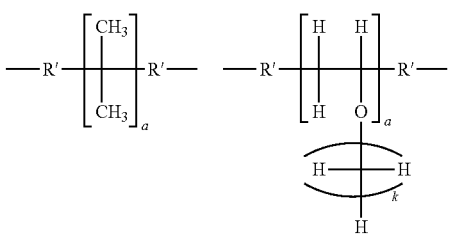

In the above formula, a represents an integer of 1 or more, preferably an integer of 1 to 20, and more preferably an integer of 2 to 6.

In the above formula, k represents an integer of 1 or more, preferably an integer of 1 to 20, more preferably an integer of 1 to 3, and still more preferably 1.

Each R' is the same or different and represents a silicon-containing group, a nitrogen-containing group, a phosphorus-containing group, an oxygen-containing group, a sulfur-containing group, or direct bond, and is preferably direct bond.

The introducing position of the divalent binding group can be suitably selected. For example, the divalent binding group can be introduced as R in the above formula (2).

Preferred examples of the hydrophobic group include the groups as shown in the following formula (2″) and the following formula (2‴).

[Chemical Formula 12]

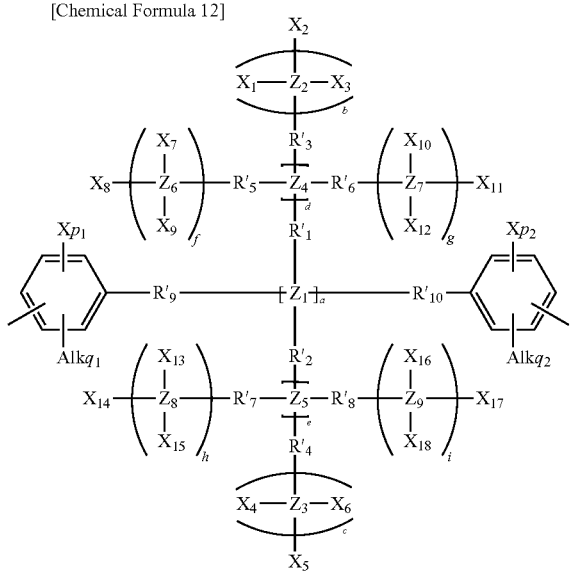

(2″)

(In the formula, Each Alk is the same or different and represents an alkyl group; Each X is the same or different and represents a halogen atom or a pseudohalide; $p_1$, $p_2$, $q_1$, and $q_2$ are the same or different and represent an integer of 0 to 4; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; and b, c, d, e, f, g, h, and i are the same or different and represent an integer of 0 or more.)

[Chemical Formula 13]

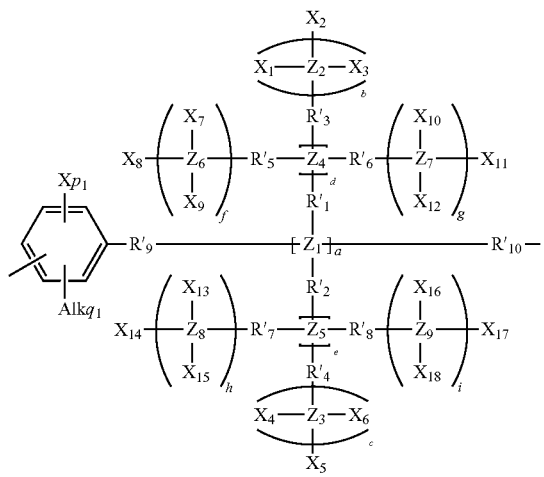

(2‴)

(In the formula, Alk represents an alkyl group; X represents a halogen atom or a pseudohalide; $p_1$ and $q_1$ represent an integer of 0 to 4; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; and b, c, d, e, f, g, h, and i are the same or different and represent an integer of 0 or more.)

Particularly preferred examples of the hydrophobic group include the groups as shown in the following formula (5), the following formula (5′), the following formula (5″), and the following formula (5‴).

[Chemical Formula 14]

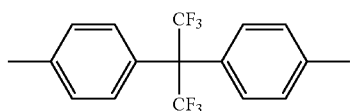

(5)

[Chemical Formula 15]

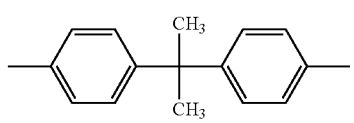

(5′)

[Chemical Formula 16]

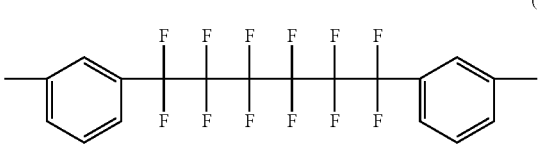

(5″)

[Chemical Formula 17]

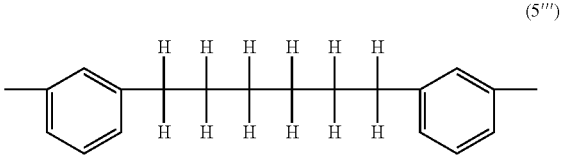

(5‴)

Other examples of the hydrophobic group include the groups having the following structures.

[Chemical Formula 18]

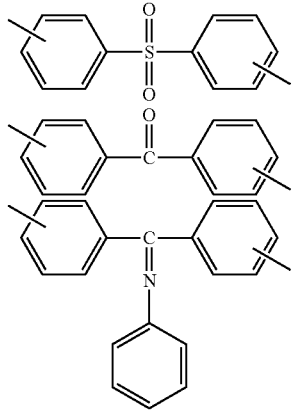

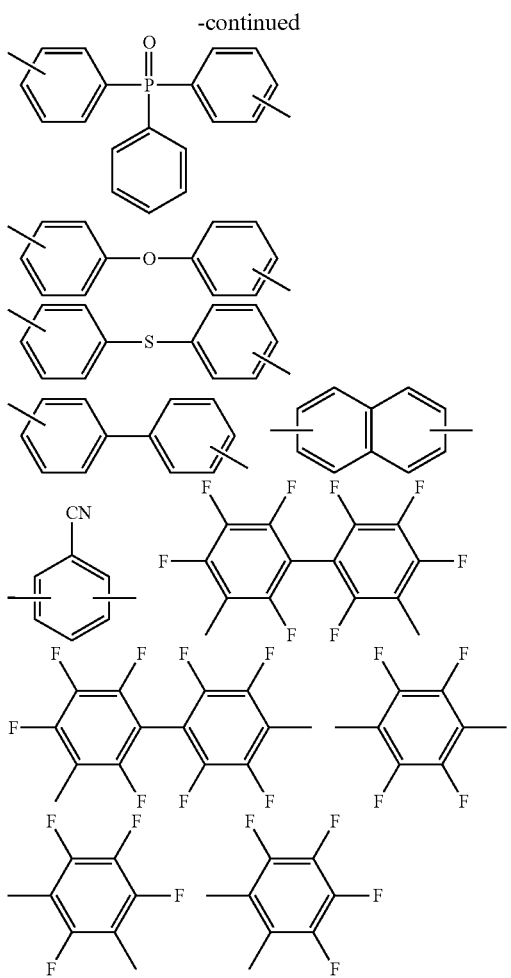

In the anion exchange resin of the present invention, the divalent hydrophilic group is formed by the residue, which is produced by introducing an aminoalkyl group (preferably tertiary aminoalkyl group) to a hydrophilic monomer and by quaternizing the amino group (preferably tertiary amino group) of the aminoalkyl group-containing monomer obtained. The hydrophilic monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, in which two halogen atoms, pseudohalides or boronate groups are bonded to the aromatic ring(s).

Examples of the aromatic ring include the aromatic rings as described above. Preferred examples of the aromatic ring include benzene ring.

Examples of the divalent hydrocarbon group include the divalent hydrocarbon groups as described above.

The number of the aromatic ring bonded to the divalent hydrocarbon group is 1 or 2, and is preferably 2.

In the aminoalkyl group-containing monomer, at least two halogen atoms, pseudohalides or boronate groups are bonded to the aromatic ring(s). If an aminoalkyl group-containing monomer composed of one aromatic ring is used, the binding position of the two halogen atoms, pseudohalides or boronate groups is on the aromatic ring. If an aminoalkyl group-containing monomer composed of two aromatic rings is used, the binding position is on each of the aromatic rings.

The divalent hydrophilic group is composed of the residue by excluding two halogen atoms, pseudohalides or boronate groups which are bonded to the aromatic ring(s) from the aminoalkyl group-containing monomer.

When one aromatic ring is further bonded to the divalent hydrocarbon group, the valence of the hydrocarbon group becomes trivalent. When two aromatic rings are further bonded to the divalent hydrocarbon group, the valence of the hydrocarbon group becomes tetravalent (if the carbon number is 1, the group is carbon atom).

If two aromatic rings are bonded to the divalent hydrocarbon group, these aromatic rings may be bonded via direct bond, for example.

The anion exchange group is introduced in the main chain or the side chain of the hydrophilic group, and is a quaternary ammonium group obtained by quaternizing the amino group of the aminoalkyl group introduced to the aminoalkyl group-containing monomer.

Preferred examples of the anion exchange group include —$CH_2N^+(CH_3)_3OH^-$. Other examples of the anion exchange group include the groups having the following structures. In the following structural formulae, * represents a moiety bonding to the aromatic ring having a substituent group (the alkyl group moiety of the aminoalkyl group), and the anion ($OH^-$) is omitted.

[Chemical Formula 19]

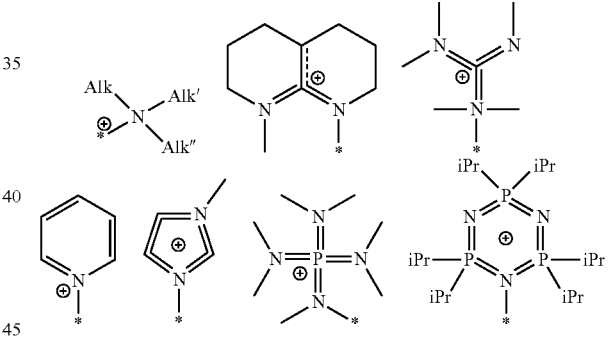

(In the figures, Alk, Alk', and Alk" represent an alkyl group as described above, and iPr represents isopropyl group.)

Examples of the aromatic ring having the anion exchange group include the aromatic rings as described above. Preferred examples of the aromatic ring include benzene ring.

When the hydrophilic group has a plurality of aromatic rings, at least one of the aromatic rings must be substituted with a substituent group having an anion exchange group. Two or more aromatic rings may be substituted with a substituent group having an anion exchange group, or all aromatic rings may be substituted with a substituent group having an anion exchange group. When two aromatic rings are bonded to the divalent hydrocarbon group, at least one of the aromatic rings must be substituted with a substituent group having an anion exchange group. For example, one of the aromatic rings in the side chain may be substituted with a substituent group having an anion exchange group, or both aromatic rings in the side chain may be substituted with a substituent group having an anion exchange group. One aromatic ring may be substituted with a plurality of substituent groups having an anion exchange group.

Preferred examples of the hydrophilic group include bisphenol residues substituted with a substituent group having the anion exchange group, as shown in the following formula (3), and an o-, m- or p-phenylene groups substituted with a substituent group having the anion exchange group, as shown in the following formula (3').

[Chemical Formula 20]

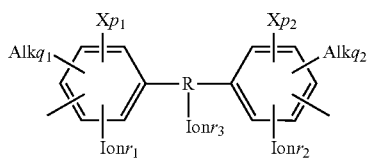

(3)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a substituent group having the anion exchange group as described above; each Alk is the same or different and represents an alkyl group; each X is the same or different and represents a halogen atom or a pseudohalide; each Ion is the same or different and represents a substituent group having an anion exchange group; $p_1$, $p_2$, $q_1$, and $q_2$ are the same or different and represent an integer of 0 to 4; $r_1$, $r_2$, and $r_3$ are the same or different and represent an integer of 0 to 4, and at least one of $r_1$, $r_2$, and $r_3$ represents 1 or more.)

[Chemical Formula 21]

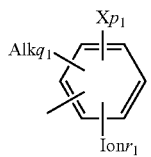

(3')

(In the formula, Alk represents an alkyl group; X represents a halogen atom or a pseudohalide; Ion represents a substituent group having an anion exchange group; p1 and q1 are represent an integer of 0 to 4; and r1 represents an integer of 1 to 4.)

In the above formula (3), each Ion is the same or different and represents a substituent group having an anion exchange group as described above, and is preferably a quaternary ammonium group as described above.

In the above formula (3), $r_1$, $r_2$, and $r_3$ are the same or different and represent an integer of 0 to 4, and at least one of $r_1$, $r_2$, and $r_3$ represents 1 or more.

In the above formula (3), when $r_1$, $r_2$, and/or $r_3$ is within a range of 1 to 3, the substituted position of the substituent group having the anion exchange group is suitably selected depending on the purpose and application.

In the above formula (3'), Ion represents a substituent group having an anion exchange group as described above, and is preferably a quaternary ammonium group as described above.

In the above formula (3'), s represents an integer of 1 to 4. The substituted position of the substituent group having the anion exchange group is suitably selected depending on the purpose and application.

The divalent binding group as shown in the above formula (1) can be introduced to the hydrophilic group. The introducing position of the divalent binding group can be suitably selected. For example, the divalent binding group can be introduced as R in the above formula (3).

Preferred examples of the hydrophilic group include bisphenol residues substituted with a substituent group having the anion exchange group, as shown in the following formula (3"), and an o-, m- or p-phenylene groups substituted with a substituent group having the anion exchange group, as shown in the following formula (3''').

[Chemical Formula 22]

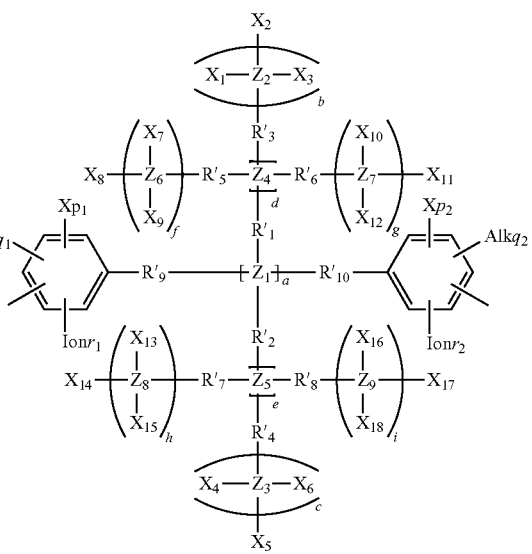

(3")

(In the formula, each Alk is the same or different and represents an alkyl group; each X is the same or different and represents a halogen atom or a pseudohalide; each Ion is the same or different and represents a substituent group having an anion exchange group; $p_1$, $p_2$, $q_1$, and $q_2$ are the same or different and represent an integer of 0 to 4; $r_1$ and $r_2$ are the same or different and represent an integer of 0 to 4, and at least one of $r_1$ and $r_2$ represents 1 or more; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more.)

[Chemical Formula 23]

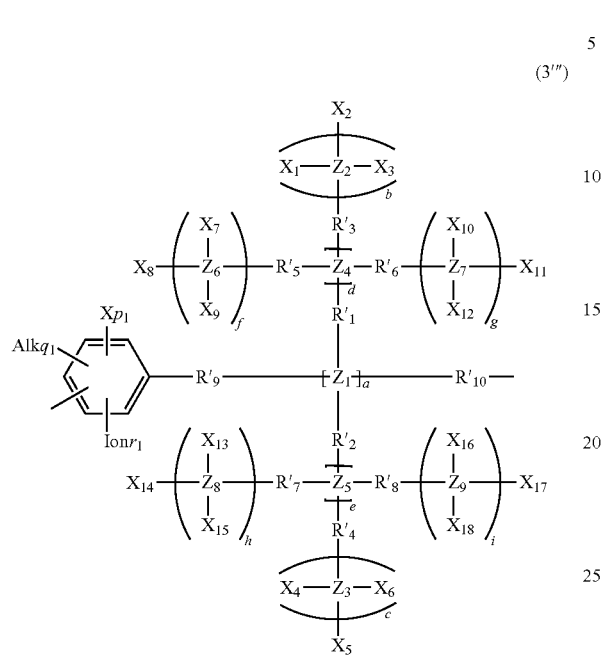

(3''')

[Chemical Formula 24]

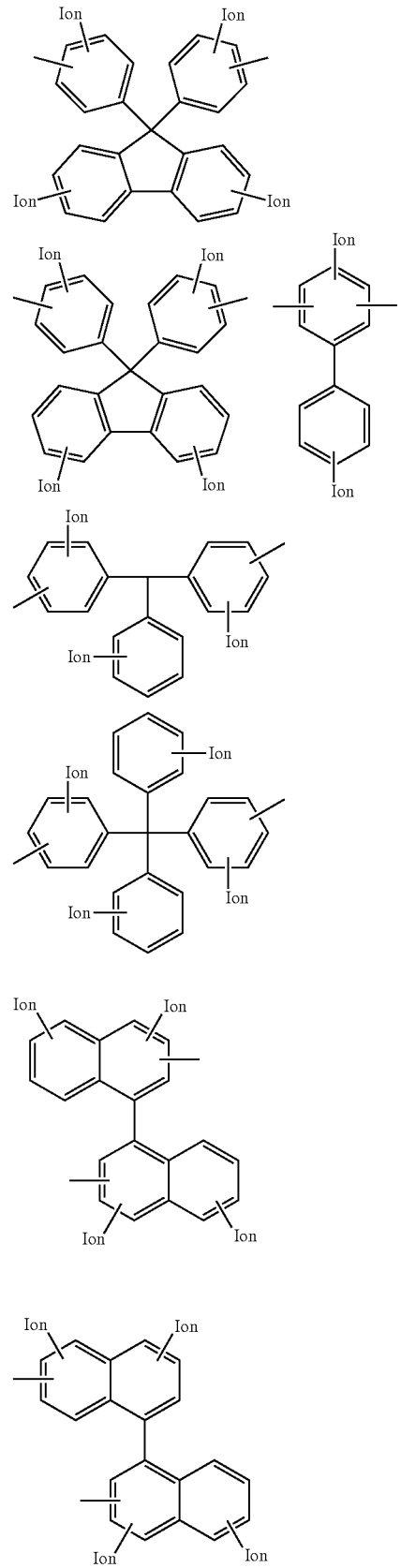

(In the formula, Alk represents an alkyl group; X represents a halogen atom or a pseudohalide; Ion represents a substituent group having an anion exchange group; $p_1$ and $q_1$ represent an integer of 0 to 4; $r_1$ represents an integer of 1 to 4; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more.)

In the above formula (3"), each Ion is the same or different and represents a substituent group having an anion exchange group as described above, and is preferably a quaternary ammonium group as described above.

In the above formula (3"), $r_1$ and $r_2$ are the same or different and represent an integer of 0 to 4, and at least one of $r_1$ and $r_2$ represents 1 or more.

In the above formula (3"), when $r_1$ and/or $r_2$ is within a range of 1 to 3, the substituted position of the substituent group having the anion exchange group is suitably selected depending on the purpose and application.

In the above formula (3'''), Ion represents a substituent group having an anion exchange group as described above, and is preferably a quaternary ammonium group as described above.

In the above formula (3'''), $r_1$ represents an integer of 1 to 4. The substituted position of the substituent group having the anion exchange group is suitably selected depending on the purpose and application.

Other examples of the hydrophilic group include the groups having the following structures.

-continued

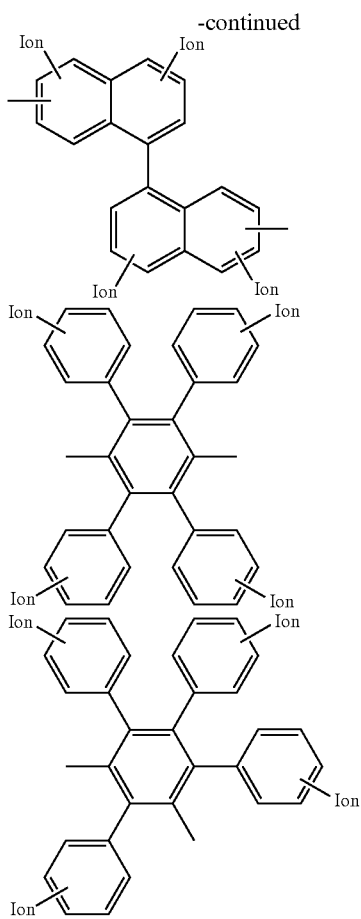

(In the formula, each Ion represents a substituent group having an anion exchange group or hydrogen atom, and at least one Ion is a substituent group having an anion exchange group. A plurality of Ions may be bonded to one benzene ring structure.)

Particularly preferred examples of the hydrophilic group include the groups as shown in the following formula (6), the following formula (6'), and the following formula (6").

[Chemical Formula 25]

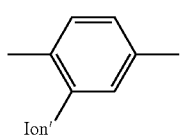
(6)

(In the formula, Ion' represents a substituent group having an anion exchange group.)

[Chemical Formula 26]

(6')

(In the formula, Ion' represents a substituent group having an anion exchange group.)

[Chemical Formula 27]

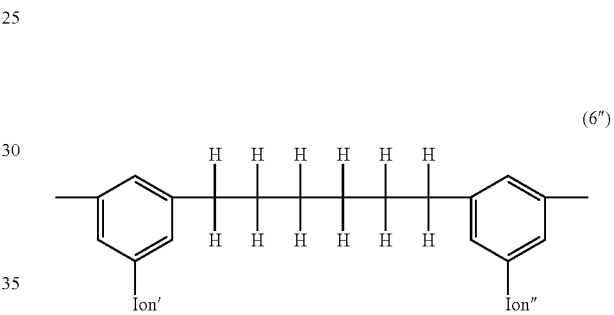
(6")

(In the formula, Ion' and Ion" represent a substituent group having an anion exchange group.)

For example, the hydrophobic group can be shown in the following formula (7), the following formula (7'), the following formula (7"), the following formula (7'''), the following formula (7''''), or the following formula (7''''').

[Chemical Formula 28]

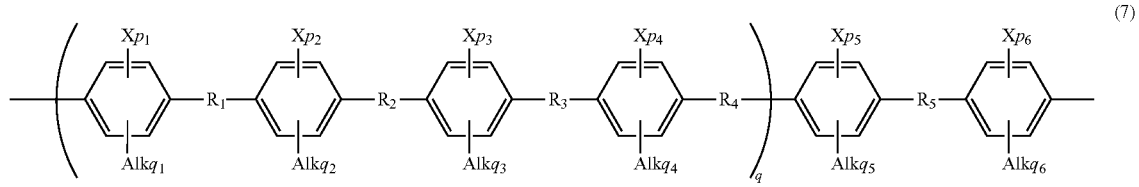
(7)

(In the formula, $R_1$, $R_2$, $R_3$, $R_4$, and $R_5$ represent a hydrocarbon group, a silicon-containing group, a nitrogen-containing group, a phosphorus-containing group, an oxygen-containing group, a sulfur-containing group, or direct bond, each of which may be substituted with a halogen atom or a pseudohalide; each X is the same or different and represents a halogen atom or a pseudohalide; each Alk is the same or different and represents an alkyl group; $p_1$, $p_2$, $p_3$, $p_4$, $p_5$, $p_6$, $q_1$, $q_2$, $q_3$, $q_4$, $q_5$, and $q_6$ are the same or different and represent an integer of 0 to 4; and q represents a number of 0 to 200.)

[Chemical Formula 29]

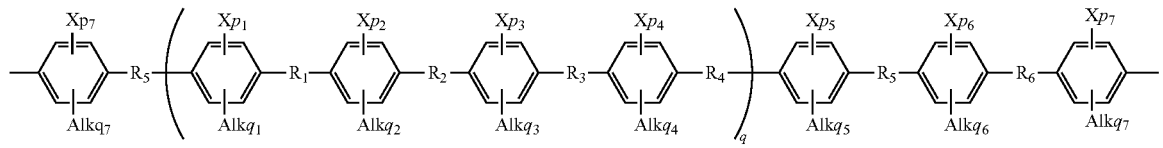

(7′)

(In the formula, $R_1$, $R_2$, $R_3$, $R_4$, $R_5$, and $R_6$ represent a hydrocarbon group, a silicon-containing group, a nitrogen-containing group, a phosphorus-containing group, an oxygen-containing group, a sulfur-containing group, or direct bond, each of which may be substituted with a halogen atom or a pseudohalide; each X is the same or different and represents a halogen atom or a pseudohalide; each Alk is the same or different and represents an alkyl group; $p_1$, $p_2$, $p_3$, $p_4$, $p_5$, $p_6$, $p_7$, $q_1$, $q_2$, $q_3$, $q_4$, $p_5$, $p_6$, and $q_7$ are the same or different and represent an integer of 0 to 4; and q represents a number of 0 to 200.)

[Chemical Formula 30]

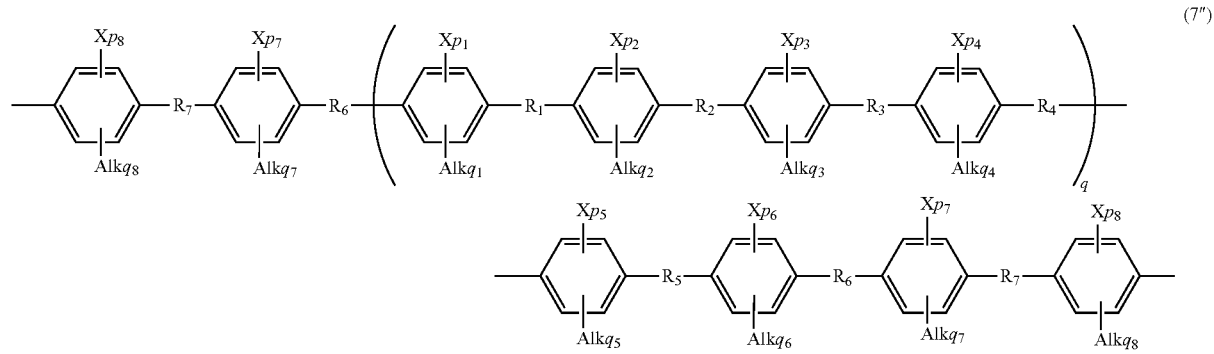

(7″)

(In the formula, $R_1$, $R_2$, $R_3$, $R_4$, $R_5$, $R_6$, and $R_7$ represent a hydrocarbon group, a silicon-containing group, a nitrogen-containing group, a phosphorus-containing group, an oxygen-containing group, a sulfur-containing group, or direct bond, each of which may be substituted with a halogen atom or a pseudohalide; each X is the same or different and represents a halogen atom or a pseudohalide; each Alk is the same or different and represents an alkyl group; $p_1$, $p_2$, $p_3$, $p_4$, $p_5$, $p_6$, $p_7$, $p_8$, $q_1$, $q_2$, $q_3$, $q_4$, $q_5$, $q_6$, $q_7$, and $q_8$ are the same or different and represent an integer of 0 to 4; and q represents a number of 0 to 200.)

[Chemical Formula 31]

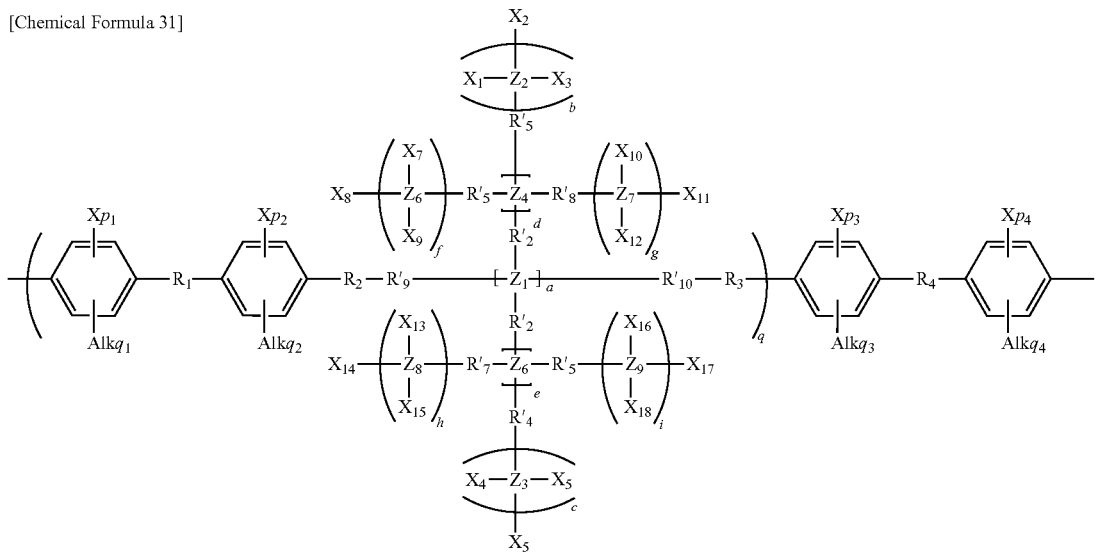

(7‴)

(In the formula, $R_1$, $R_2$, $R_3$, and $R_4$ represent a hydrocarbon group, a silicon-containing group, a nitrogen-containing group, a phosphorus-containing group, an oxygen-containing group, a sulfur-containing group, or direct bond, each of which may be substituted with a halogen atom or a pseudohalide; each X is the same or different and represents a halogen atom or a pseudohalide; each Alk is the same or different and represents an alkyl group; $p_1$, $p_2$, $p_3$, $p_4$, $q_1$, $q_2$, $q_3$, and $q_4$ are the same or different and represent an integer of 0 to 4; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more; and q represents a number of 0 to 200.)

[Chemical Formula 32]

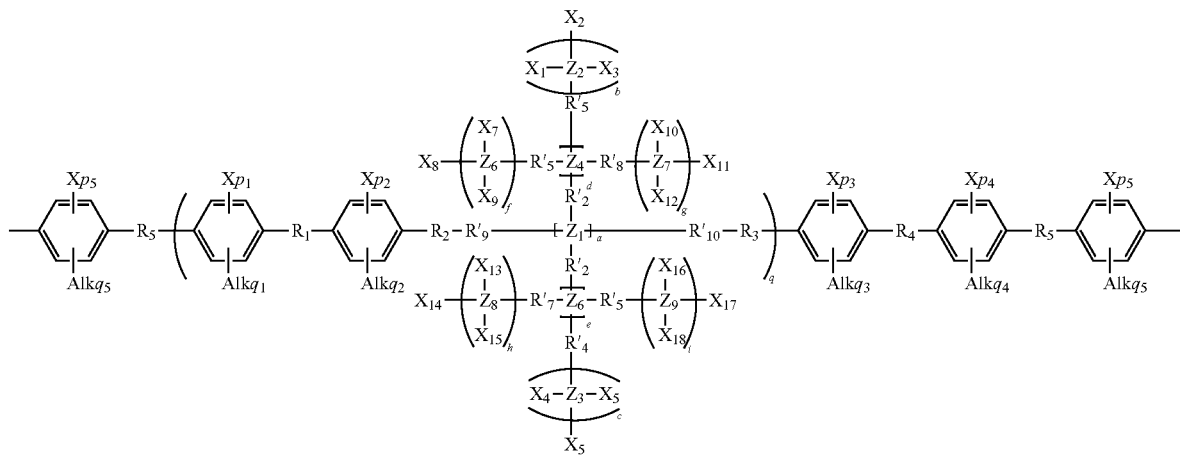

(7'''')

(In the formula, $R_1$, $R_2$, $R_3$, $R_4$, and $R_5$ represent a hydrocarbon group, a silicon-containing group, a nitrogen-containing group, a phosphorus-containing group, an oxygen-containing group, a sulfur-containing group, or direct bond, each of which may be substituted with a halogen atom or a pseudohalide; each X is the same or different and represents a halogen atom or a pseudohalide; each Alk is the same or different and represents an alkyl group; $p_1$, $p_2$, $p_3$, $p_4$, $p_5$, $q_1$, $q_2$, $q_3$, $q_4$, and $q_5$ are the same or different and represent an integer of 0 to 4; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more; and q represents a number of 0 to 200.)

[Chemical Formula 33]

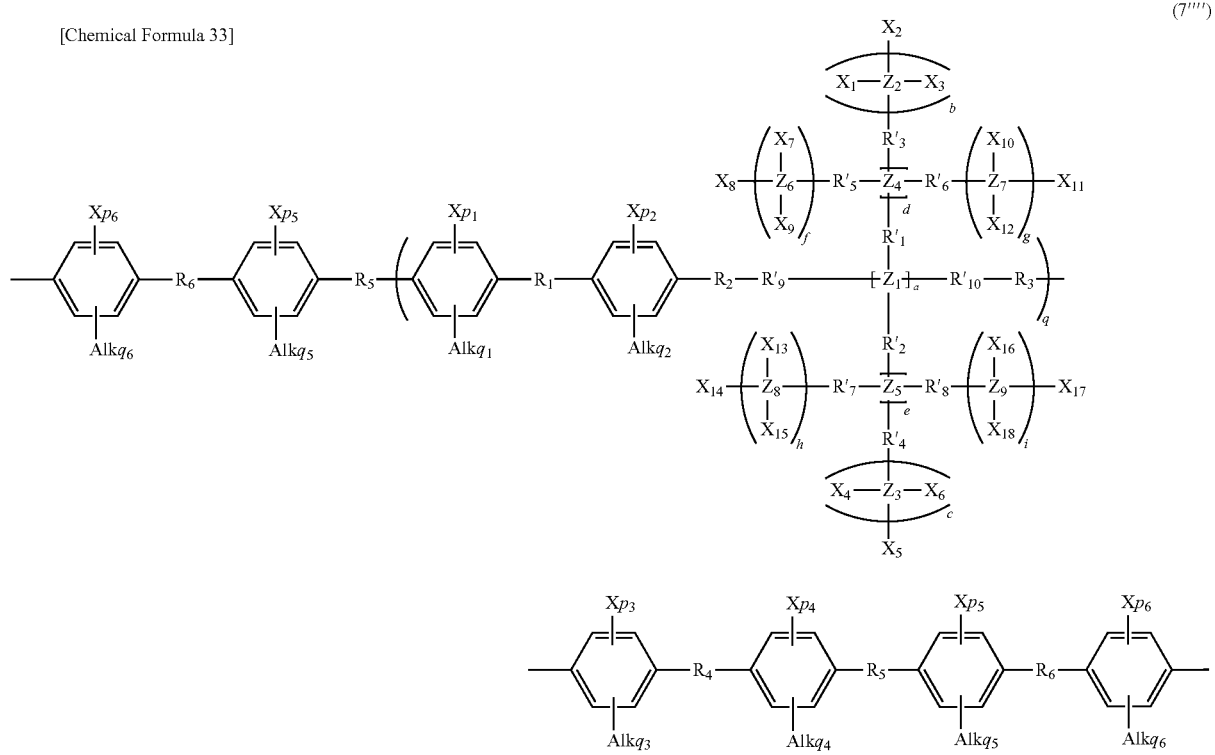

(7'''')

(In the formula, $R_1$, $R_2$, $R_3$, $R_4$, $R_5$, and $R_6$ represent a hydrocarbon group, a silicon-containing group, a nitrogen-containing group, a phosphorus-containing group, an oxygen-containing group, a sulfur-containing group, or direct bond, each of which may be substituted with a halogen atom or a pseudohalide; each X is the same or different and represents a halogen atom or a pseudohalide; each Alk is the same or different and represents an alkyl group; $p_1$, $p_2$, $p_3$, $p_4$, $p_5$, $p_6$, $q_1$, $q_2$, $q_3$, $q_4$, $q_5$, and $q_6$ are the same or different and represent an integer of 0 to 4; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more; and q represents a number of 0 to 200.)

For example, the hydrophobic group can be shown in the following formula (8), the following formula (8'), the following formula (8"), the following formula (8'''), the following formula (8''''), or the following formula (8''''').

[Chemical Formula 34]

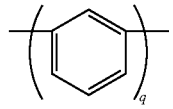

(8)

(In the formula, q represents a number of 0 to 200.)

[Chemical Formula 35]

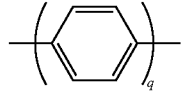

(8')

(In the formula, q represents a number of 0 to 200.)

[Chemical Formula 36]

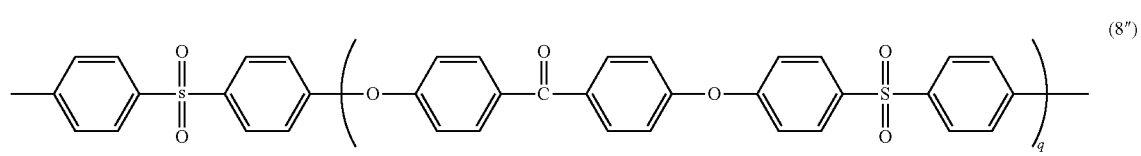

(8")

(In the formula, q represents a number of 0 to 200.)

[Chemical Formula 37]

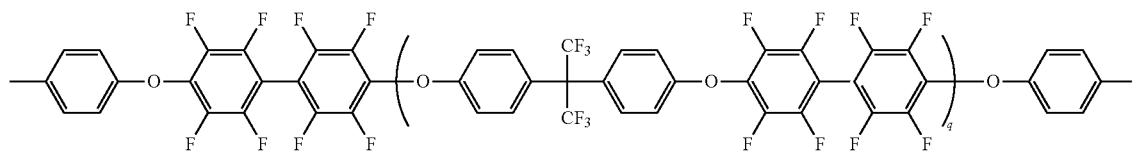

(8''')

(In the formula, q represents a number of 0 to 200.)

[Chemical Formula 38]

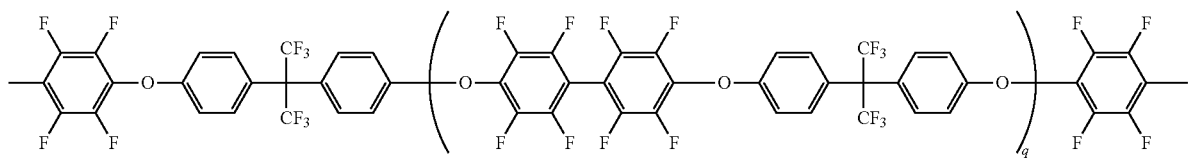

(8'''')

(In the formula, q represents a number of 0 to 200.)

[Chemical Formula 38]

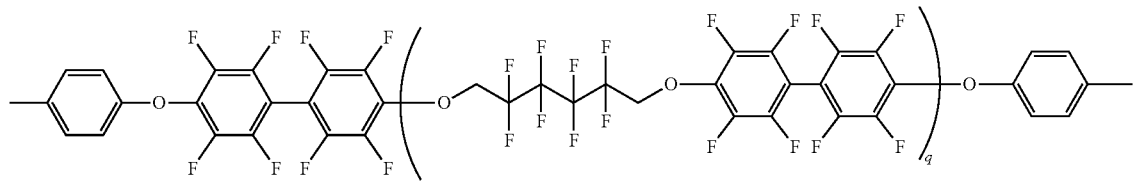

(8''''')

(In the formula, q represents a number of 0 to 200.)

In the anion exchange resin of the present invention, a hydrophobic group as described above and a hydrophilic group as described above are bonded via direct bond.

In the anion exchange resin of the present invention, the divalent binding group is bonded via a divalent hydrocarbon group, a divalent silicon-containing group, a divalent nitrogen-containing group, a divalent phosphorus-containing group, a divalent oxygen-containing group, a divalent sulfur-containing group, or direct bond in the main chain of the hydrophobic group and/or the hydrophilic group. Particularly preferably, the divalent binding group is bonded via direct bond in the main chain of the hydrophobic group and/or the hydrophilic group. More preferably, the divalent binding group is bonded via direct bond in the main chain of the hydrophobic group. If the divalent binding group is introduced to the main chain of the hydrophobic group, the whole moiety is referred as the hydrophobic group. If the divalent binding group is introduced to the main chain of the hydrophilic group, the whole moiety is referred as the hydrophilic group.

Preferred examples of the anion exchange resin include anion exchange resins formed by bonding the hydrophobic unit as shown in the above formula (2'') and the aminoalkyl group-containing group as shown in the above formula (3') via direct bond, as shown in the following formula (12); anion exchange resins formed by bonding the hydrophobic unit as shown in the above formula (2'') and the aminoalkyl group-containing group as shown in the above formula (3'') via direct bond, as shown in the following formula (12'); anion exchange resins formed by bonding the hydrophobic unit as shown in the above formula (7) and the aminoalkyl group-containing group as shown in the above formula (3') via direct bond, as shown in the following formula (12''); anion exchange resins formed by bonding the hydrophobic unit as shown in the above formula (7') and the aminoalkyl group-containing group as shown in the above formula (3') via direct bond, as shown in the following formula (12'''); and anion exchange resins formed by bonding the hydrophobic unit as shown in the above formula (7'''') and the aminoalkyl group-containing group as shown in the above formula (3') via direct bond, as shown in the following formula (12'''').

[Chemical Formula 40]

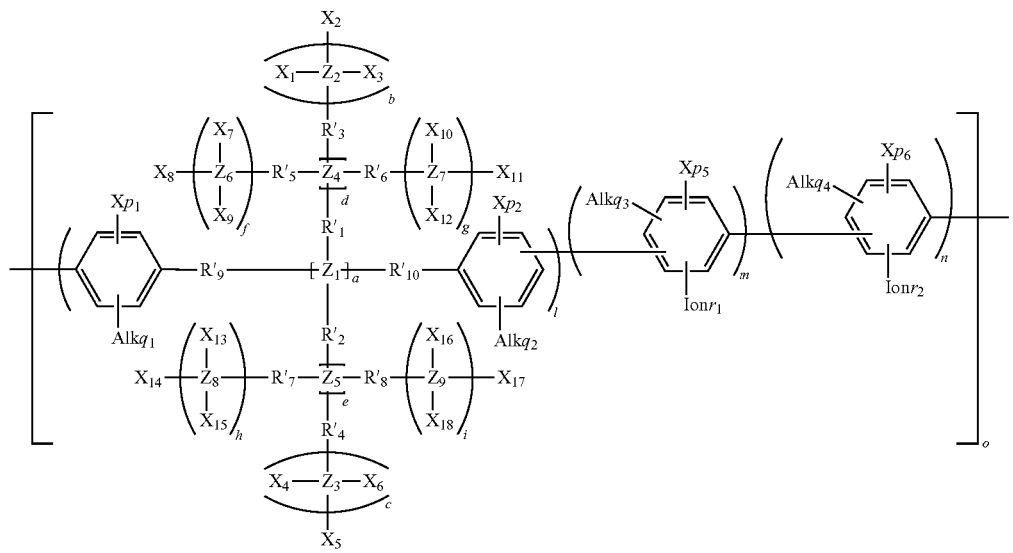

(12)

(In the formula, each X is the same or different and represents a halogen group, a pseudohalogen group, or a boronate group; each Alk is the same or different and represents an alkyl group; each Ion is the same or different and represents a substituent group having an anion exchange group; $p_1$, $p_2$, $p_3$, $p_4$, $q_1$, $q_2$, $q_3$, and $q_4$ are the same or different and represent an integer of 0 to 4; $r_1$ and $r_2$ are the same or different and represent an integer of 0 to 4, at least one of $r_1$ and $r_2$ represents 1 or more; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more; l, m, and n represent the blending ratio; and o represents a number of 1 to 100.)

[Chemical Formula 41]

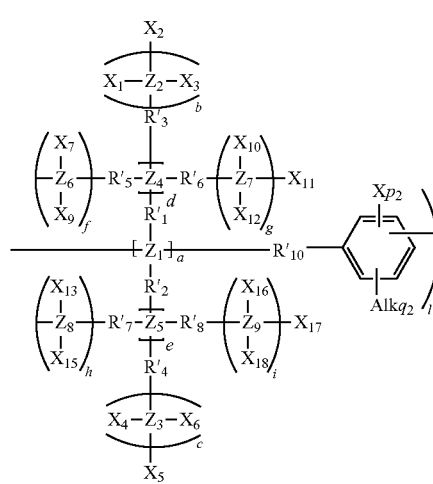 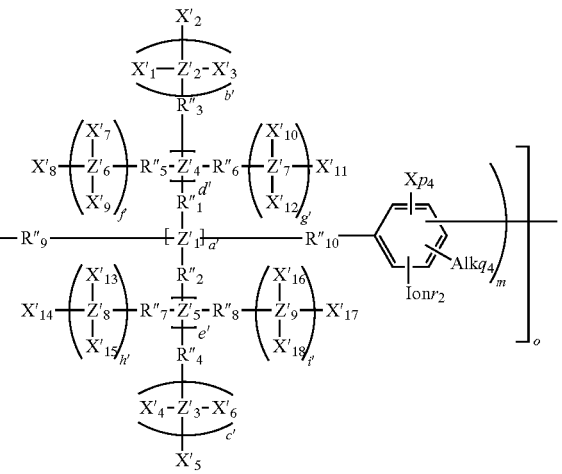

(12')

(In the formula, each X are the same or different and represent a halogen group, a pseudohalogen group, or a boronate group; each Alk is the same or different and represents an alkyl group; each Ion is the same or different and represents a substituent group having an anion exchange group; $p_1$, $p_2$, $p_3$, $p_4$, $q_1$, $q_2$, $q_3$, and $q_4$ are the same or different and represent an integer of 0 to 4; $r_1$ and $r_2$ are the same or different and represent an integer of 0 to 4, and at least one of $r_1$ and $r_2$ represents 1 or more; $Z_1$ to $Z_9$ and $Z'_1$ to $Z'_9$ are the same or different and represent a carbon atom or a silicon atom; $R'_1$ to $R'_{10}$ and $R''_1$ to $R''_{10}$ are the same or different and represent a silicon-containing group, a nitrogen-containing group, a phosphorus-containing group, an oxygen-containing group, a sulfur-containing group, or direct bond; $X_1$ to $X_{18}$ and $X'_1$ to $X'_{18}$ are the same or different and represent a halogen atom, a pseudohalide, or hydrogen atom; a and a' represents an integer of 1 or more; b, c, d, e, f, g, h, i, b', c', d', e', f', g', h', and i' are the same or different and represent an integer of 0 or more; l and m represent the blending ratio; and o represents a number of 1 to 100.)

[Chemical Formula 42]

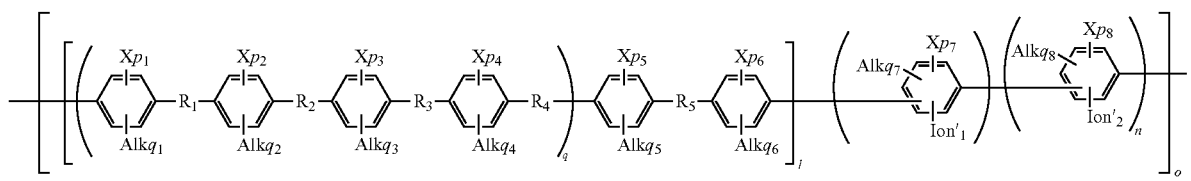

(12'')

(In the formula, each X are the same or different and represent a halogen group, a pseudohalogen group, or a boronate group; each Alk is the same or different and represents an alkyl group; each Ion is the same or different and represents a substituent group having an anion exchange group; $p_1$, $p_2$, $p_3$, $p_4$, $p_5$, $p_6$, $p_7$, $p_8$, $q_1$, $q_2$, $q_3$, $q_4$, $q_5$, $q_6$, $q_7$, and $q_8$ are the same or different and represent an integer of 0 to 4; $r_1$ and $r_2$ are the same or different and represent an integer of 0 to 4, at least one of $r_1$ and $r_2$ represents 1 or more; q represents a number of 0 to 200; l, m, and n represent the blending ratio; and o represents a number of 1 to 100.)

[Chemical Formula 43]

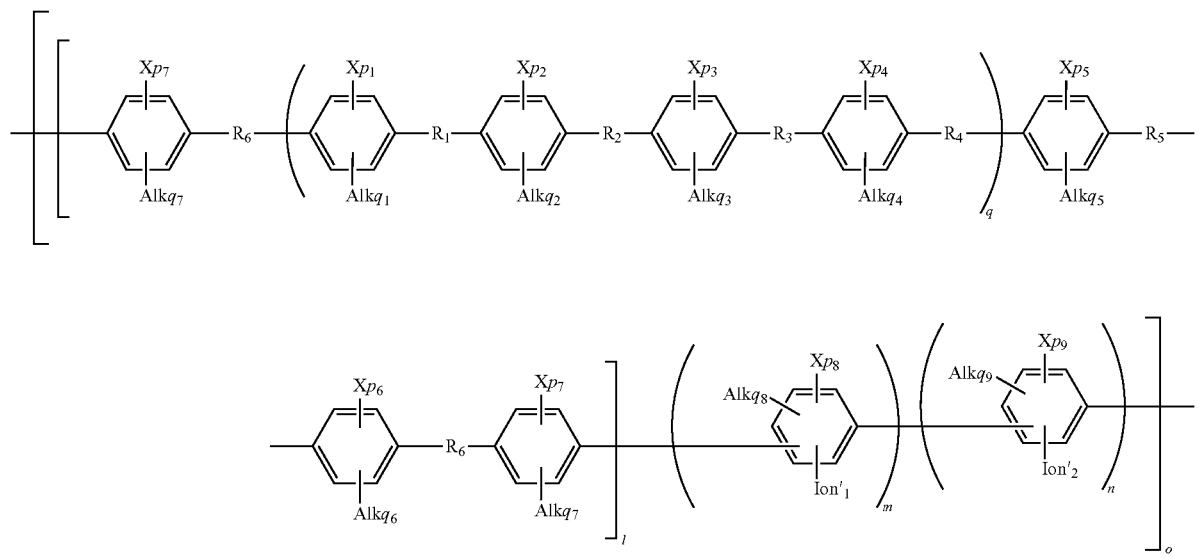

(12''')

(In the formula, each X are the same or different and represent a halogen group, a pseudohalogen group, or a boronate group; each Alk is the same or different and represents an alkyl group; each Ion is the same or different and represents a substituent group having an anion exchange group; $p_1$, $p_2$, $p_3$, $p_4$, $p_5$, $p_6$, $p_7$, $p_8$, $p_9$, $q_1$, $q_2$, $q_3$, $q_4$, $q_5$, $q_6$, $q_7$, $q_8$, and $q_9$ are the same or different and represent an integer of 0 to 4; $r_1$ and $r_2$ are the same or different and represent an integer of 0 to 4, at least one of $r_1$ and $r_2$ represents 1 or more; q represents a number of 0 to 200; l, m, and n represent the blending ratio; and o represents a number of 1 to 100.)

[Chemical Formula 44]

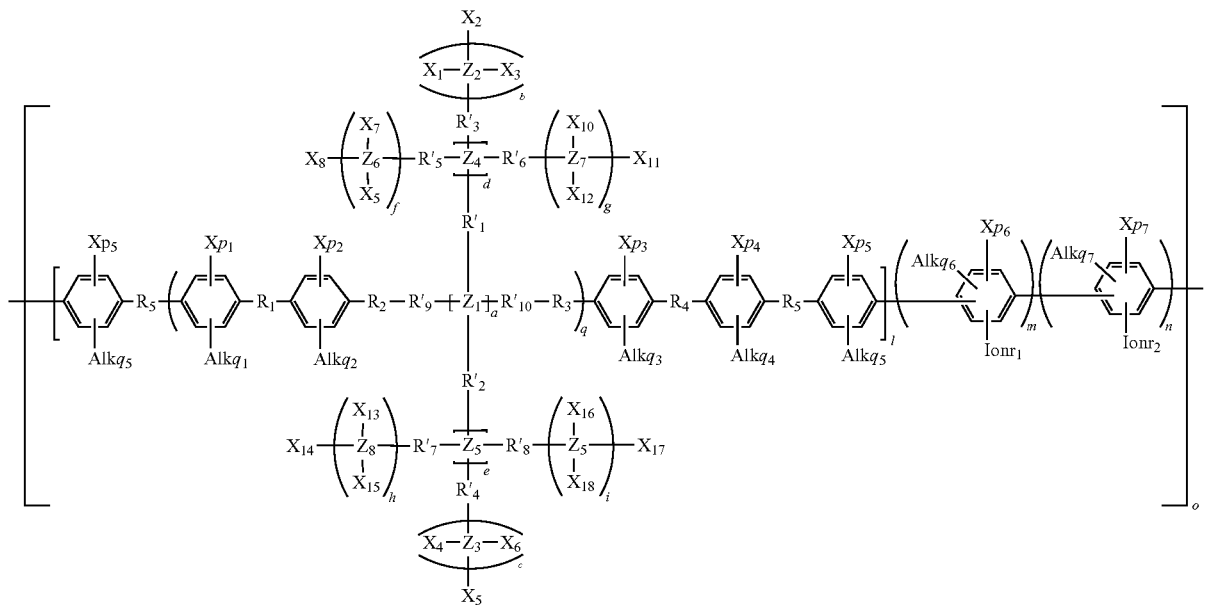

(12'''')

(In the formula, each X are the same or different and represent a halogen group, a pseudohalogen group, or a boronate group; each Alk is the same or different and represents an alkyl group; each Ion is the same or different and represents a substituent group having an anion exchange group; $p_1$, $p_2$, $p_3$, $p_4$, $p_5$, $p_6$, $p_7$, $q_1$, $q_2$, $q_3$, $q_4$, $q_5$, $q_6$, and $q_7$ are the same or different and represent an integer of 0 to 4; $r_1$ and $r_2$ are the same or different and represent an integer of 0 to 4, at least one of $r_1$ and $r_2$ represents 1 or more; $Z_1$ to $Z_9$ are the same or different and represent carbon atom or silicon atom; $R'_1$ to $R'_{10}$ are the same or different and represent a silicon-containing group, a nitrogen-containing group, a phosphorus-containing group, an oxygen-containing group, a sulfur-containing group, or direct bond; $X_1$ to $X_{18}$ are the same or different and represent a halogen atom, a pseudohalide, or hydrogen atom; a represents an integer of 1 or more; b, c, d, e, f, g, h, and i are the same or different and represent an integer of 0 or more; q represents a number of 0 to 200; l, m, and n represent the blending ratio; and o represents a number of 1 to 100.)

The number average molecular weight of the anion exchange resin is adjusted to be from 10 to 1000 kDa, and preferably from 30 to 500 kDa.

Particularly preferred examples of the anion exchange resin include anion exchange resins formed by bonding the hydrophobic group as shown in the above formula (5") and the aminoalkyl group-containing group as shown in the above formula (6') and the above formula (6) to each other via direct bond, as shown in the following formula (13); anion exchange resins formed by bonding the hydrophobic group as shown in the above formula (5''') and the aminoalkyl group-containing group as shown in the above formula (6') and the above formula (6) to each other via direct bond, as shown in the following formula (13'); anion exchange resins formed by bonding the hydrophobic group as shown in the above formula (5'''') and the aminoalkyl group-containing group as shown in the above formula (6'') to each other via direct bond, as shown in the following formula (13''); anion exchange resins formed by bonding the hydrophobic group as shown in the above formula (8'') and the aminoalkyl group-containing group as shown in the above formula (6') and the above formula (6) to each other via direct bond, as shown in the following formula (13'''); anion exchange resins formed by bonding the hydrophobic group as shown in the above formula (8''') and the aminoalkyl group-containing group as shown in the above formula (6') and the above formula (6) to each other via direct bond, as shown in the following formula (13''''); and anion exchange resins formed by bonding the hydrophobic group as shown in the above formula (8'''') and the aminoalkyl group-containing group as shown in the above formula (6') and the above formula (6) to each other via direct bond, as shown in the following formula (13''''').

[Chemical Formula 45]

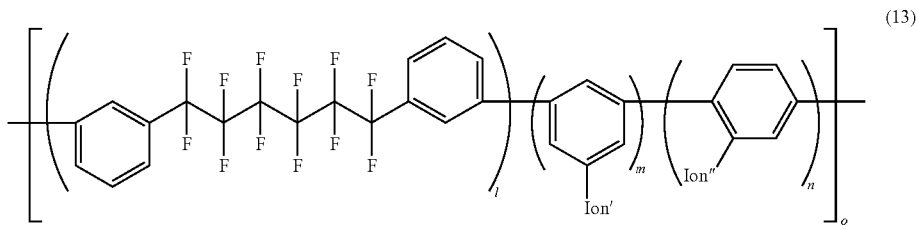

(13)

(In the formula, Ion' and Ion" are the same or different and have the same meaning as Ion' in the above formula (6); l, m, n, and o have the same meaning as l, m, n, and o in the above formula (12).)

[Chemical Formula 46]

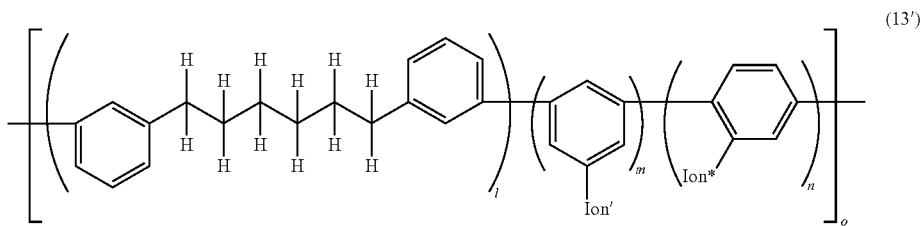

(13')

(In the formula, Ion' and Ion" are the same or different and have the same meaning as Ion' in the above formula (6); l, m, n, and o have the same meaning as l, m, n, and o in the above formula (12).)

[Chemical Formula 47]

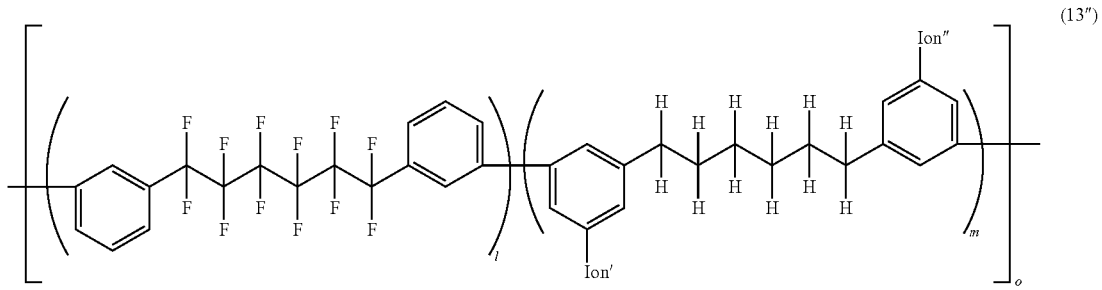

(13")

(In the formula, Ion' and Ion" are the same or different and have the same meaning as Ion' in the above formula (6); l, m, and o have the same meaning as l, m, and o in the above formula (12).)

[Chemical Formula 48]

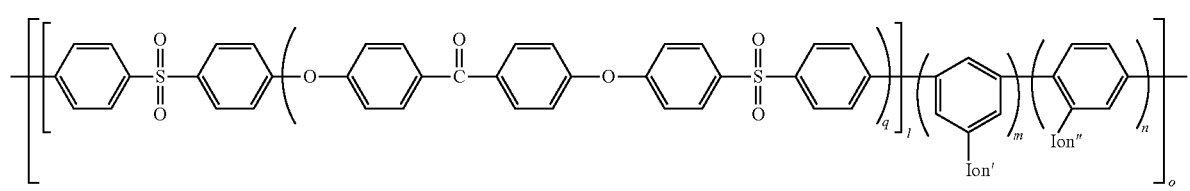

(13''')

(In the formula, Ion' and Ion'' are the same or different and have the same meaning as Ion' in the above formula (6); q, l, m, n, and o have the same meaning as q, l, m, n, and o in the above formula (12).)

[Chemical Formlua 49]

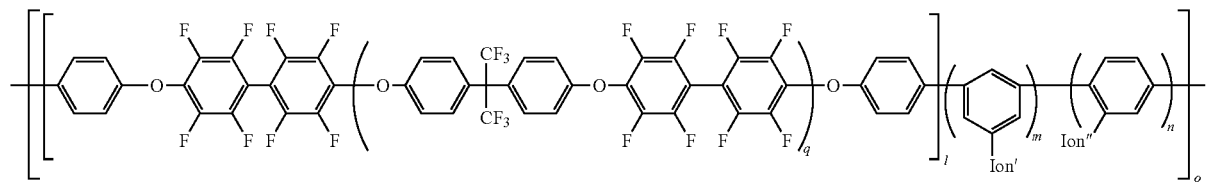

(13'''')

(In the formula, Ion' and Ion'' are the same or different and have the same meaning as Ion' in the above formula (6); q, l, m, n, and o have the same meaning as q, l, m, n, and o in the above formula (12).)

[Chemical Formula 50]

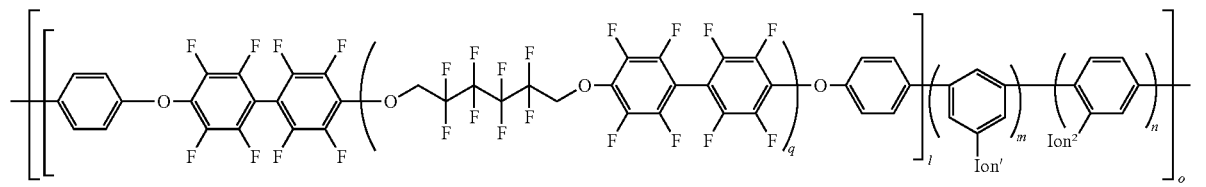

(13''''')

(In the formula, Ion' and Ion'' are the same or different and have the same meaning as Ion' in the above formula (6); q, l, m, n, and o have the same meaning as q, l, m, n, and o in the above formula (12).)

As described above, the number average molecular weight of the anion exchange resin is, for example, from 10 to 1000 kDa, and preferably from 30 to 500 kDa.

The method for producing the anion exchange resin is not particularly limited, and any method known in the art can be used. Preferably, the method by the polycondensation reaction is used.

Specifically, the anion exchange resin can be produced by (A) preparing a hydrophobic monomer or a hydrophobic oligomer; (B) preparing an aminoalkyl group-containing monomer, (C) reacting (polymerizing by cross-coupling reaction) the hydrophobic monomer or the hydrophobic oligomer with the aminoalkyl group-containing monomer to synthesize a polymer; and (D) quaternizing the amino group in the polymer.

As the hydrophobic monomer, a monomer, which is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, in which two halogen atoms, pseudohalides or boronate groups are bonded to the aromatic ring(s), can be used.

The hydrophobic oligomer is obtained by the polycondensation reaction of a compound for forming the hydrophobic group. Preferably, the hydrophobic oligomer is obtained by polycondensing a diol compound for forming the hydrophobic group and a dihalogenated compound, and then optionally polycondensing a linking group; or is obtained by polycondensing dihalogenated compounds each other, and then optionally polycondensing a linking group.

For the polycondensation reaction, any conventional known method can be used. Preferably, nucleophilic substitution reaction, aromatic nucleophilic substitution reaction, or cross-coupling is used.

For producing the hydrophobic oligomer, a diol compound for forming the hydrophobic group and a dihalogenated compound are firstly polycondensed.

Examples of the diol compound for forming the hydrophobic group include compounds, which have a plurality of (preferably two) aromatic rings as described above which are bonded to each other via a divalent hydrocarbon group as described above, and which have two hydroxyl groups which are bonded to the aromatic rings.

Preferred examples of the diol compound for forming the hydrophobic group include the compounds as shown in the following formula (14), which correspond to the above formula (2).

[Chemical Formula 51]

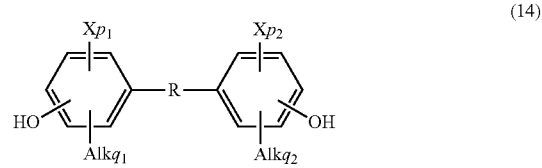

(14)

(In the formula, R has the same meaning as R in the above formula (2); Alk has the same meaning as Alk in the above formula (2); X has the same meaning as X in the above formula (2); and $p_1$, $p_2$, $q_1$, and $q_2$ have the same meaning as $p_1$, $p_2$, $q_1$, and $q_2$ in the above formula (2).)

Particularly preferred examples of the diol compound for forming the hydrophobic group include the compounds as shown in the following formula (14'), the following formula (14"), and the following formula (14'''), which correspond to the above formula (5), the above formula (5'), and the above formula (4").

[Chemical Formula 52]

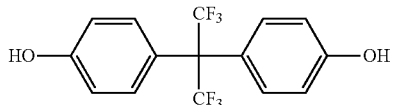
(14')

[Chemical Formula 53]

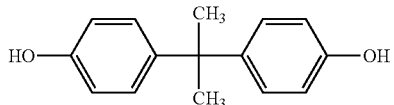
(14")

[Chemical Formula 54]

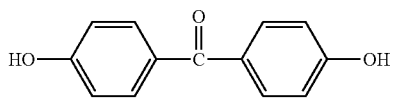
(14''')

On the other hand, examples of the dihalogenated compound for forming the hydrophobic group include compounds, which have a plurality of (preferably two) aromatic rings as described above which are bonded to each other via the divalent hydrocarbon group as described above, and which have two halogen atoms or pseudohalides which are bonded to the aromatic rings.

Preferred examples of the dihalogenated compound for forming the hydrophobic group include the compounds as shown in the following formula (15), which correspond to the above formula (2).

[Chemical Formula 55]

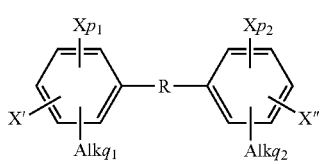
(15)

(In the formula, R has the same meaning as R in the above formula (2); Alk has the same meaning as Alk in the above formula (2); X' and X" are the same or different and represent a halogen group, a pseudohalogen group, or a boronate group; and $p_1$, $p_2$, $q_1$, and $q_2$ have the same meaning as $p_1$, $p_2$, $q_1$, and $q_2$ in the above formula (2).)

Particularly preferred examples of the dihalogenated compound for forming the hydrophobic group include the compounds as shown in the following formula (16) and the following formula (16'), which corresponds to the above formula (4) and the above formula (4').

[Chemical Formula 56]

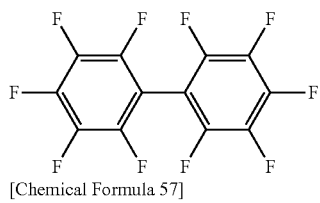
(16)

[Chemical Formula 57]

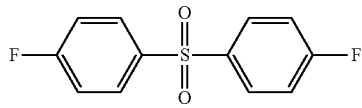
(16')

In the polycondensation reaction for forming the hydrophobic group, the blending ratio of the diol compound and the dihalogenated compound for forming the hydrophobic group is adjusted so that the repeating number in the resulting oligomer (a first oligomer) is q in the above formula (12), the above formula (12') or the above formula (12").

The first oligomer is formed as a dihalogenated compound or a diol compound.

When the first oligomer is formed as the dihalogenated compound, the blending ratio of the diol compound and the dihalogenated compound is adjusted so that an excessive amount of the dihalogenated compound exists. Specifically, for 1 mol of the diol compound, the amount of the dihalogenated compound is preferably $(q+1)/q$ mol in a relationship of q in the above formula (7).

On the other hand, when the first oligomer is formed as the diol compound, the blending ratio of the diol compound and the dihalogenated compound is adjusted so that an excessive amount of the diol compound exists. Specifically, for 1 mol of the dihalogenated compound, the amount of the diol compound is preferably $(q+1)/q$ mol in a relationship of q in the above formula (7).

In the method, the diol compound and the dihalogenated compound for forming the hydrophobic group are polycondensed in an organic solvent.

Examples of the organic solvent include polar aprotic solvents.

Examples of the polar aprotic solvent include dimethyl sulfoxide, sulfolane, pyridine, N-methylpyrrolidone, N-cyclohexylpyrrolidone, N,N-dimethylformamide, and N,N-dimethyl acetamide.

The polar aprotic solvent may be used alone or in combination with two or more kinds.

Preferred examples of polar aprotic solvents include N,N-dimethylacetamide, and dimethyl sulfoxide.

As the organic solvent, a different solvent may be further used together.

The different solvent is not particularly limited. Examples of the different solvent include any known nonpolar solvents such as, for example, aliphatic hydrocarbons, halogenated aliphatic hydrocarbons (for example, chloroform), alicyclic hydrocarbons (for example, cyclohexane), and aromatic hydrocarbons; and any known aprotic aromatic solvents such as, for example, toluene, xylene, chlorobenzene or o-dichlorobenzene.

When the polar aprotic solvent is used in combination with the different solvent, the blending ratio is suitably selected depending on the purpose and application.

The blending ratio of the organic solvent to the diol compound and the dihalogenated compound for forming the hydrophobic group is suitably selected depending on the purpose and application.

In the polycondensation reaction, a basic compound can be blended.

Examples of the basic compound include carbonate salts such as lithium carbonate, sodium carbonate, sodium hydrogen carbonate, potassium carbonate, potassium hydrogen carbonate, cesium carbonate, magnesium carbonate, and calcium carbonate; metal hydroxides such as lithium hydroxide, sodium hydroxide, and potassium hydroxide; and phosphate salts such as sodium phosphate, sodium hydrogen phosphate, sodium dihydrogen phosphate, potassium phosphate, potassium hydrogen phosphate, and potassium dihydrogen phosphate.

The basic compound may be used alone or in combination with two or more kinds.

Preferred examples of the basic compound include metal carbonate salts, and more preferred examples of the basic compound include potassium carbonate.

For example, when a carbonate salt catalyst is used, the blending amount of the basic compound is the same amount as hydroxyl groups presented in the reaction mixture, and preferably 1.2 or more mole with respect to 1 mole of hydroxyl groups presented in the reaction mixture.

The reaction temperature in the polycondensation reaction is, for example, from 50 to 300° C., and preferably from 50 to 200° C. The reaction time is, for example, from 1 to 20 hours, and preferably from 2 to 5 hours.

The first oligomer is preferably obtained as the dihalogenated compound by reacting the diol compound as shown in the above formula (14) and the dihalogenated compound as shown in the above formula (15), as described above.

Specifically, such dihalogenated compound is shown in the following formula (17).

[Chemical Formula 58]

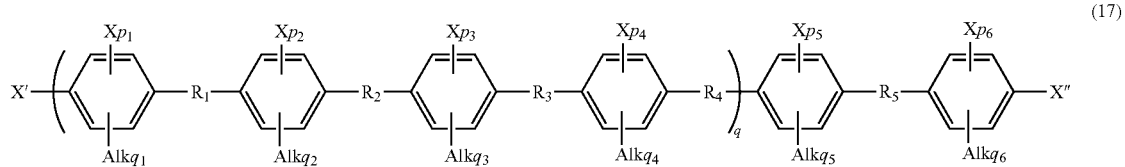

(17)

(In the formula, $R_1$ to $R_5$ have the same meaning as $R_1$ to $R_5$ in the above formula (7); Alk has the same meaning as Alk in the above formula (2); X has the same meaning as X in the above formula (2); X' and X" have the same meaning as X' and X" in the above formula (15); $p_1$ to $p_6$ and $q_1$ to $q_6$ have the same meaning as $p_1$ to $p_6$ and $q_1$ to $q_6$ in the above formula (7); and q has the same meaning as q in the above formula (7).)

Particularly preferred examples of the first oligomer include the dihalogenated compounds as shown in the following formula (18) and following formula (18').

[Chemical Formula 59]

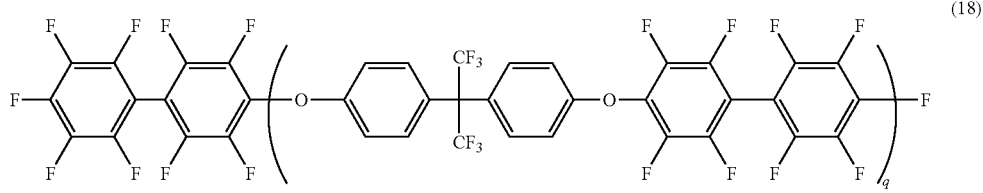

(18)

(In the formula, q has the same meaning as q in the above formula (7).)

[Chemical Formula 60]

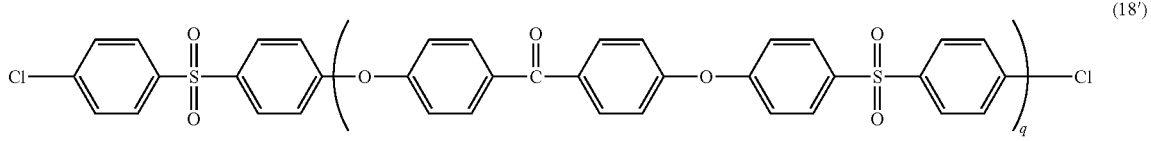

(18')

(In the formula, q has the same meaning as q in the above formula (7).)

When the first oligomer obtained as the dihalogenated compound has a binding group, the first oligomer is preferably obtained as the dihalogenated compound by reacting the diol compound having the binding group as shown in the above formula (1) with the dihalogenated compound as shown in the above formula (15).

Specifically, the dihalogenated compound having the binding group is shown in the following formula (17').

[Chemical Formula 61]

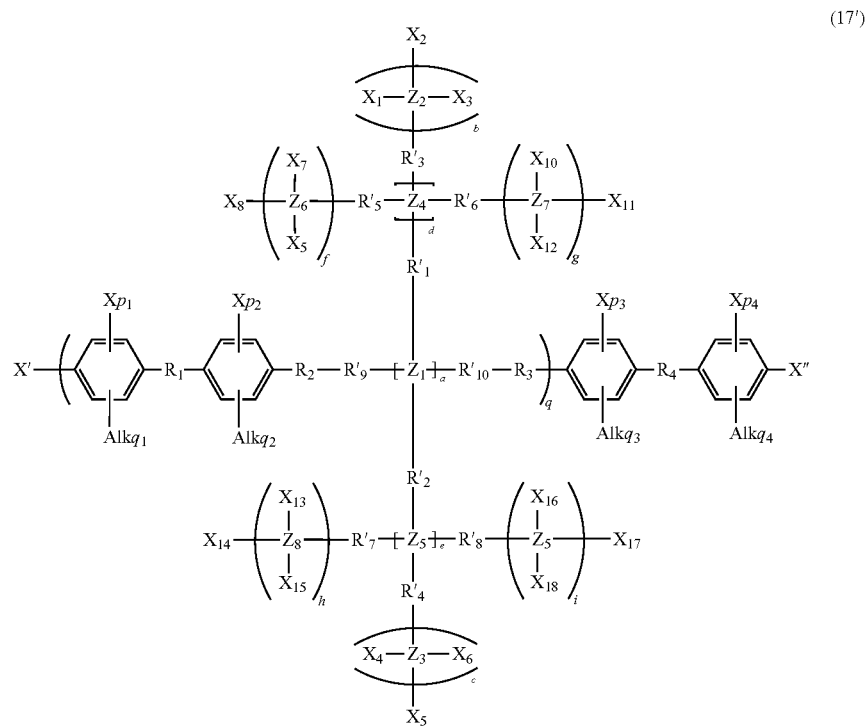

(17')

(In the formula, $R_1$ to $R_4$ have the same meaning as $R_1$ to $R_4$ in the above formula (7); $R'_1$ to $R'_{10}$ have the same meaning as $R'_1$ to $R'_{10}$ in the above formula (1); Alk has the same meaning as Alk in the above formula (2); X has the same meaning as X in the above formula (2); $X_1$ to $X_{18}$ have the same meaning as $X_1$ to $X_{18}$ in the above formula (1); X' and X" have the same meaning as X' and X" in the above formula (15); $Z_1$ to $Z_9$ have the same meaning as $Z_1$ to $Z_9$ in the above formula (1); a, b, c, d, e, f, g, h, and i have the same meaning as a, b, c, d, e, f, g, h, and i in the above formula (1); $p_1$ to $p_4$ and $q_1$ to $q_4$ have the same meaning as $p_1$ to $p_4$ and $q_1$ to $q_4$ in the above formula (7); and q has the same meaning as q in the above formula (7).)

Particularly preferred examples of the first oligomer having the fluorine-containing group include the dihalogenated compounds as shown in the following formula (18").

[Chemical Formula 62]

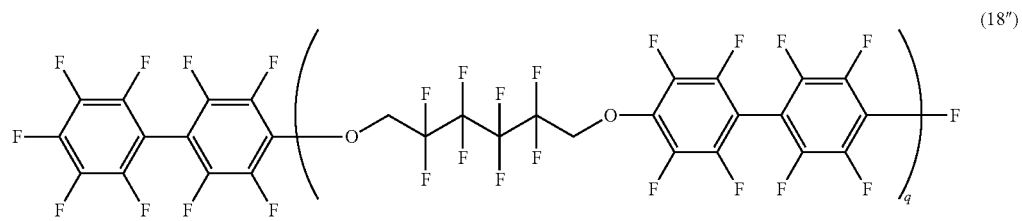

(18")

(In the formula, q has the same meaning as q in the above formula (7).)

For example, the first oligomer can also be obtained as the diol compound by reacting the dihalogenated compound as shown in the above formula (15) with the diol compound as shown in the above formula (14), as described above.

Specifically, the diol compound is shown in the following formula (17″).

[Chemical Formula 63]

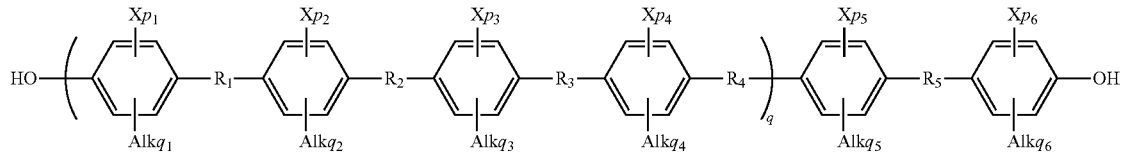

(17″)

(In the formula, $R_1$ to $R_5$ have the same meaning as $R_1$ to $R_5$ in the above formula (7); Alk has the same meaning as Alk in the above formula (2); X has the same meaning as X in the above formula (2); $p_1$ to $p_6$ and $q_1$ to $q_6$ have the same meaning as $p_1$ to $p_6$ and $q_1$ to $q_6$ in the above formula (7); and q has the same meaning as q in the above formula (7).)

When the first oligomer obtained as the diol compound has a binding group, the first oligomer is preferably obtained as the dihalogenated compound by reacting the diol compound having the binding group as shown in the above formula (1) with the dihalogenated compound as shown in the above formula (15), as described above.

Specifically, the diol compound having the binding group is shown in the following formula (17‴).

[Chemical Formula 64]

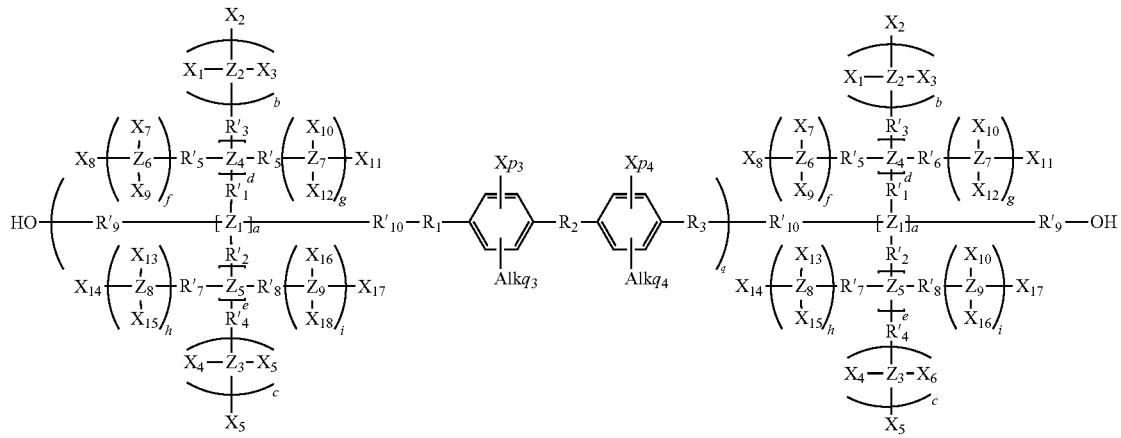

(17‴)

(In the formula, $R_1$ to $R_3$ have the same meaning as $R_1$ to $R_3$ in the above formula (7); $R'_1$ to $R'_{10}$ have the same meaning as $R'_1$ to $R'_{10}$ in the above formula (1); Alk has the same meaning as Alk in the above formula (2); X has the same meaning as X in the above formula (2); $X_1$ to $X_{18}$ have the same meaning as $X_1$ to $X_{18}$ in the above formula (1); $Z_1$ to $Z_9$ have the same meaning as $Z_1$ to $Z_9$ in the above formula (1); a, b, c, d, e, f, g, h, and i have the same meaning as a, b, c, d, e, f, g, h, and i in the above formula (1); $p_1$ to $p_4$ and $q_1$ to $q_4$ have the same meaning as $p_1$ to $p_4$ and $q_1$ to $q_4$ in the above formula (7); and q has the same meaning as q in the above formula (7).)

For example, in the above formula (17″), when the fluorine-containing group is the dihalogenated compound, the fluorine-containing group can be obtained as the dihalogenated compound as shown in the following formula (17″″). Alternatively, in the above formula (17′), when the fluorine-containing group is the dihalogenated compound, the fluorine-containing group can be obtained as the diol compound as shown in the following formula (17″″′).

[Chemical Formula 65]

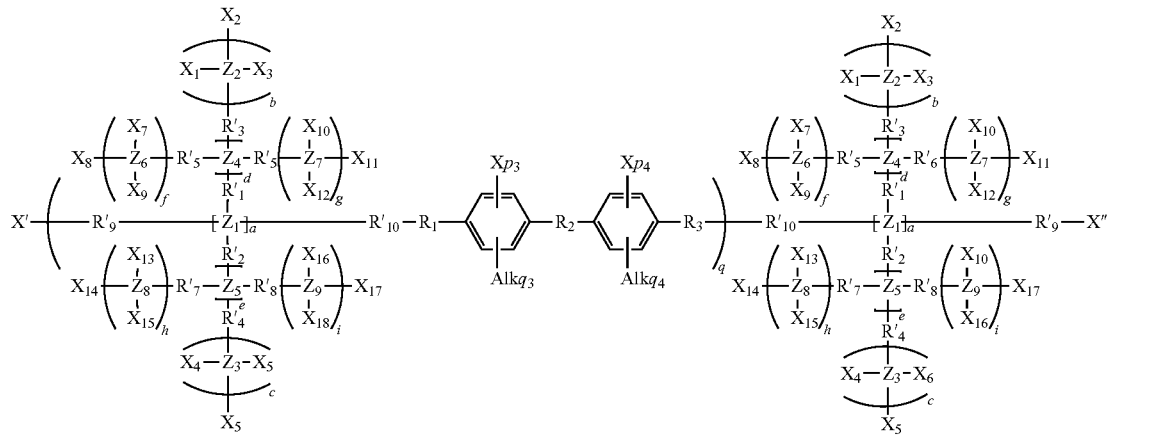

(17''''')

(In the formula, $R_1$ to $R_3$ have the same meaning as $R_1$ to $R_3$ in the above formula (7); $R'_1$ to $R'_{10}$ have the same meaning as $R'_1$ to $R'_{10}$ in the above formula (1); Alk has the same meaning as Alk in the above formula (2); X has the same meaning as X in the above formula (2); $X_1$ to $X_{18}$ have the same meaning as $X_1$ to $X_{18}$ in the above formula (1); X' and X" have the same meaning as X' and X" in the above formula (15); $Z_1$ to $Z_9$ have the same meaning as $Z_1$ to $Z_9$ in the above formula (1); a, b, c, d, e, f, g, h, and i have the same meaning as a, b, c, d, e, f, g, h, and i in the above formula (1); $p_1$ to $p_4$ and $q_1$ to $q_4$ have the same meaning as $p_1$ to $p_4$ and $q_1$ to $q_4$ in the above formula (7); and q has the same meaning as q in the above formula (7).)

meaning as Alk in the above formula (2); X has the same meaning as X in the above formula (2); $X_1$ to $X_{18}$ have the same meaning as $X_1$ to $X_{18}$ in the above formula (1); $Z_1$ to $Z_9$ have the same meaning as $Z_1$ to $Z_9$ in the above formula (1); a, b, c, d, e, f, g, h, and i have the same meaning as a, b, c, d, e, f, g, h, and i in the above formula (1); $p_1$ to $p_4$ and $q_1$ to $q_4$ have the same meaning as $p_1$ to $p_4$ and $q_1$ to $q_4$ in the above formula (7); and q has the same meaning as q in the above formula (7).)

When the hydrophobic group is bonded to the hydrophilic group via direct bond, the hydrophobic oligomer can be produced by polycondensing the halogenated phenol com-

[Chemical Formula 66]

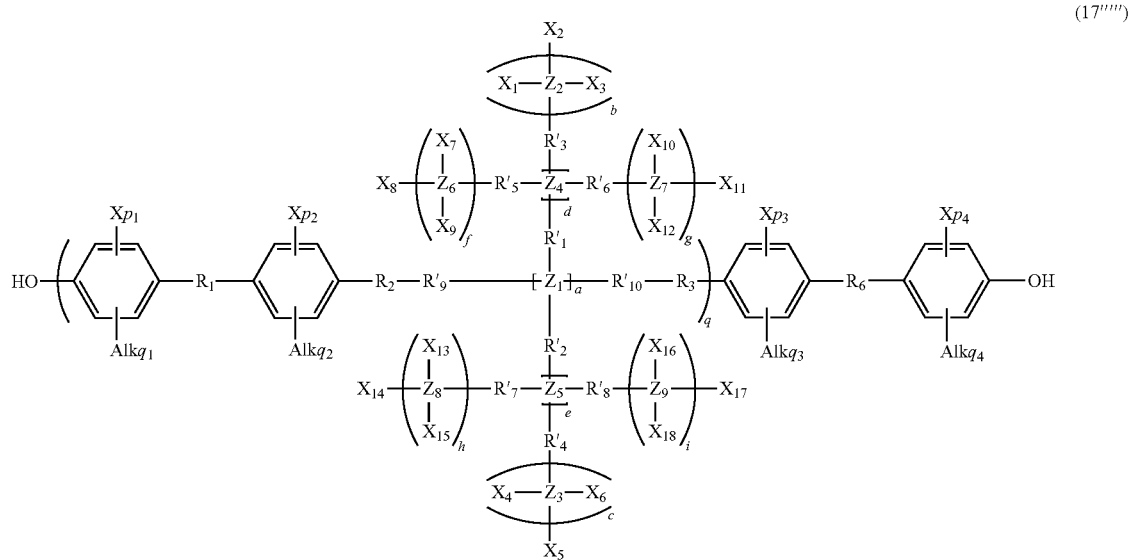

(17''''')

(In the formula, $R_1$ to $R_4$ have the same meaning as $R_1$ to $R_4$ in the above formula (7); $R'_1$ to $R'_{10}$ have the same meaning as $R'_1$ to $R'_{10}$ in the above formula (1); Alk has the same pound as the linking group to the hydrophilic group with the first oligomer, the dihalogenated compound, for forming the hydrophobic group, for example.

Preferred examples of the halogenated phenol compound for forming the hydrophobic group include the compounds as shown in the following formula (19) or (19').

[Chemical Formula 67]

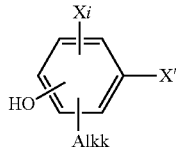

(19)

(In the formula, Alk has the same meaning as Alk in the above formula (2); X' has the same meaning as X' and X" in the above formula (15); i and k represent an integer of 0 to 4.)

[Chemical Formula 68]

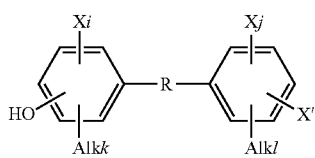

(19')

(In the formula, R has the same meaning as R in the above formula (2); Alk has the same meaning as Alk in the above formula (2); X' has the same meaning as X' and X" in the above formula (15); i, j, k, and l are the same or different and represent an integer of 0 to 4.)

Particularly preferred examples of the halogenated phenol compound for forming the hydrophobic group include the compound as shown in the following formula (19").

[Chemical Formula 69]

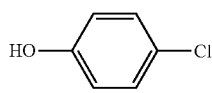

(19")

The hydrophobic oligomer is preferably obtained as the dihalogenated compound by reacting the dihalogenated compound as shown in the above formula (17) with the halogenated phenol compound as shown in the above formula (19).

Specifically, the dihalogenated compound is shown in the following formula (20).

[Chemical Formula 70]

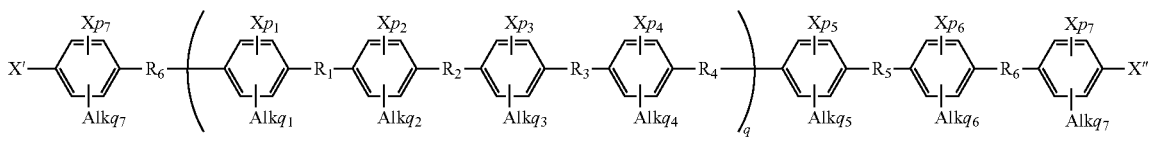

(20)

(In the formula, $R_1$ to $R_6$ have the same meaning as $R_1$ to $R_6$ in the above formula (7'); Alk has the same meaning as Alk in the above formula (2); X has the same meaning as X in the above formula (2); X' and X" have the same meaning as X' and X" in the above formula (15); $p_1$ to $p_7$ and $q_1$ to $q_7$ have the same meaning as $p_1$ to $p_7$ and $q_1$ to $q_7$ in the above formula (7'); and q has the same meaning as q in the above formula (7).)

The hydrophobic oligomer is particularly preferably obtained as the dihalogenated compound by reacting the dihalogenated compound as shown in the above formula (18) with the halogenated phenol compound as shown in the above formula (19").

Specifically, the dihalogenated compound is shown in the following formula (20').

[Chemical Formula 71]

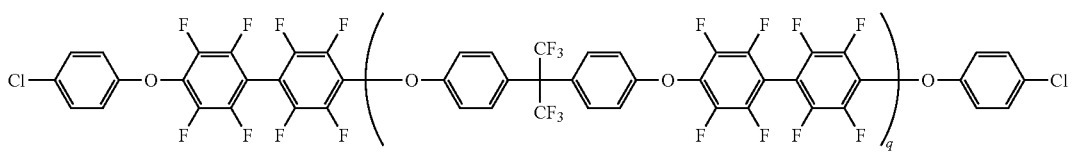

(20')

(In the formula, q has the same meaning as q in the above formula (7).)

When the hydrophobic oligomer has a binding group, the hydrophobic oligomer is preferably obtained as the dihalogenated compound having the binding group by reacting the dihalogenated compound having the binding group as shown in the above formula (17') with the halogenated phenol compound as shown in the above formula (19).

Specifically, the dihalogenated compound having the binding group is shown in the following formula (20").

[Chemical Formula 72]

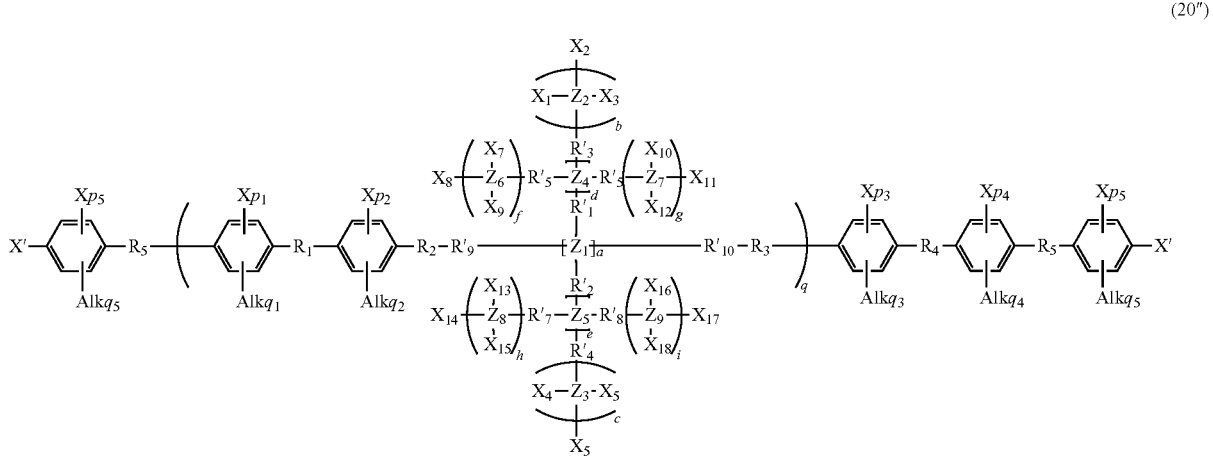

(20")

(In the formula, $R_1$ to $R_5$ have the same meaning as $R_1$ to $R_5$ in the above formula (7'); $R'_1$ to $R'_{10}$ have the same meaning as $R'_1$ to $R'_{10}$ in the above formula (1); Alk has the same meaning as Alk in the above formula (2); X has the same meaning as X in the above formula (2); $X_1$ to $X_{18}$ have the same meaning as $X_1$ to $X_{18}$ in the above formula (1); X' and X" have the same meaning as X' and X" in the above formula (15); $Z_1$ to $Z_9$ have the same meaning as $Z_1$ to $Z_9$ in the above formula (1); a, b, c, d, e, f, g, h, and i have the same meaning as a, b, c, d, e, f, g, h, and i in the above formula (1); $p_1$ to $p_5$ and $q_1$ to $q_5$ have the same meaning as $p_1$ to $p_5$ and $q_1$ to $q_5$ in the above formula (7'); and q has the same meaning as q in the above formula (7).)

When the hydrophobic group and the hydrophilic group form direct bond, the hydrophobic oligomer can be produced by polycondensing the dihalogenated benzene compound as the linking group to the hydrophilic group with the first oligomer, the diol compound, for forming the hydrophobic group, for example.

Preferred examples of the dihalogenated benzene compound for forming the hydrophobic group include the compound as shown in the following formula (19a) or (19a').

[Chemical Formula 73]

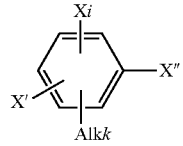

(19a)

[Chemical Formula 74]

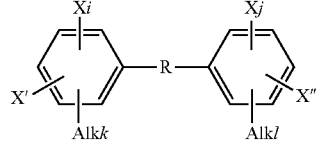

(19a')

(In the formula, Alk has the same meaning as Alk in the above formula (2); X has the same meaning as X in the above formula (2); X' and X" has the same meaning as X' and X" in the above formula (15); i and k are the same or different and represent an integer of 0 to 4.)

(In the formula, R has the same meaning as R in the above formula (2); Alk has the same meaning as Alk in the above formula (2); X has the same meaning as X in the above formula (2); X' and X" has the same meaning as X' and X" in the above formula (15); i, j, k, and l are the same or different and represent an integer of 0 to 4.)

Particularly preferred examples of the dihalogenated benzene compound for forming the hydrophobic group include the compound as shown in the following formula (19a").

[Chemical Formula 75]

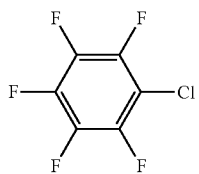

(19a")

For producing the first oligomer for forming direct bond, the dihalogenated compounds for forming the hydrophobic groups are firstly cross-coupled each other.

Examples of the dihalogenated compound for forming the hydrophobic group include compounds, which have a plurality of (preferably two) aromatic rings as described above which are bonded to each other via the divalent hydrocarbon group, and which have two halogeno groups which are bonded to the aromatic rings, as shown in the above formula (19a).

As the aminoalkyl group-containing monomer, a monomer, which is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond; in which two halogen atoms, pseudohalides or boronate groups are bonded to the aromatic ring(s); and in which at least one of aromatic rings has an aminoalkyl group, can be used.

Preferred examples of the aminoalkyl group-containing monomer include the compounds as shown in the following formula (21), which correspond to the above formula (3); and the compounds as shown in the following formula (21'), which correspond to the above formula (3').

[Chemical Formula 76]

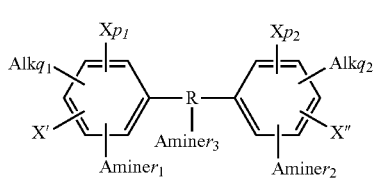

(21)

(In the formula, R has the same meaning as R in the above formula (3); Alk has the same meaning as Alk in the above formula (3); X has the same meaning as X in the above formula (3); X' and X" have the same meaning as X' and X" in the above formula (15); each Amine is the same or different and represents a substituent group having an aminoalkyl group; and $p_1$, $p_2$, $q_1$, $q_2$, $r_1$, $r_2$, and $r_3$ have the same meaning as $p_1$, $p_2$, $q_1$, $q_2$, $r_1$, $r_2$, and $r_3$ in the above formula (3).)

[Chemical Formula 77]

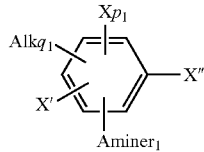

(21')

(In the formula, Alk has the same meaning as Alk in the above formula (3); X has the same meaning as X in the above formula (3); X' and X" have the same meaning as X' and X" in the above formula (15); each Amine is the same or different and represents a substituent group having an aminoalkyl group; and $p_1$, $q_1$, and $r_1$ have the same meaning as $p_1$, $q_1$, and $r_1$ in the above formula (3).)

Particularly preferred examples of the aminoalkyl group-containing monomer include the monomers as shown in the following formula (22), (22'), and (22").

[Chemical Formula 78]

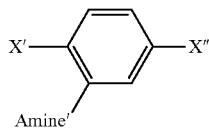

(22)

(In the formula, X' and X" have the same meaning as X' and X" in the above formula (15); and Amine' represents a substituent group having an aminoalkyl group.)

[Chemical Formula 79]

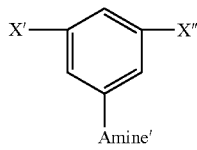

(22')

(In the formula, X' and X" have the same meaning as X' and X" in the above formula (15); and Amine' represents a substituent group having an aminoalkyl group.)

[Chemical Formula 80]

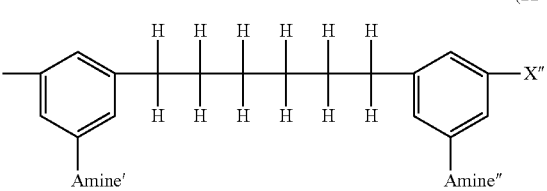

(22")

(In the formula, X' and X" have the same meaning as X' and X" in the above formula (15); and Amine' and Amine" represent a substituent group having an aminoalkyl group.)

The hydrophobic monomer or the hydrophobic oligomer is prepared, and then aminoalkyl group-containing monomer is prepared. After that, both monomers are reacted (polymerized by cross-coupling reaction) to synthesize a polymer.

In the cross-coupling reaction, the blending ratio of the aminoalkyl group-containing monomer is adjusted so that the repeating number of the hydrophilic group in the resulting precursor polymer for the anion exchange resin is m in the above formula (12) or formula (12').

In the method, any method known in the art can be used including a method by dissolving the hydrophobic monomer or the hydrophobic oligomer and the aminoalkyl group-containing monomer in a solvent such as N,N-dimethylacetamide or dimethyl sulfoxide, and then polymerizing them in the presence of a catalyst such as bis(1,5-cyclooctadiene) nickel (0).

The reaction temperature in the cross-coupling reaction is, for example, from −100 to 300° C., and preferably from −50 to 200° C. The reaction time is, for example, from 1 to 20 hours, and preferably from 2 to 5 hours.

The amino group in the resulting polymer is quaternized to produce the anion exchange resin.

The quaternizing reaction is not particularly limited. For example, any method known in the art can be used including a method by adding the precursor polymer for the anion exchange resin to a solvent such as N,N-dimethyl acetamide, N,N-dimethyl formamide, dimethyl sulfoxide, sulfolane, pyridine, N-methylpyrrolidone, N-cyclohexylpyrrolidone, methanol, ethanol, and water and adding a compound such as methyl iodide, dimethyl sulfate, and methyl trifluoromethanesulfonate.

The reaction temperature in the quaternizing reaction is, for example, from 20 to 100° C., and preferably from 30 to 60° C. The reaction time is, for example, from 24 to 200 hours, and preferably from 36 to 120 hours.

In the method, the compound such as methyl iodide, dimethyl sulfate, and methyl trifluoromethanesulfonate is optionally removed by any method known in the art.

In the quaternizing reaction, the precursor polymer for the anion exchange resin may be optionally formed into a film by any method known in the art, and may be immersed in a solution such as N,N-dimethyl acetamide, N,N-dimethyl formamide, dimethyl sulfoxide, sulfolane, pyridine, N-methylpyrrolidone, N-cyclohexylpyrrolidone, methanol, ethanol, or water, which contains a compound such as methyl iodide, dimethyl sulfate, and methyl trifluoromethanesulfonate.

From the reaction, the anion exchange resin, preferably the anion exchange resin as shown in the above formula (12) or the anion exchange resin as shown in the above formula (12'), and particularly preferably, the anion exchange resin as shown in the above formula (13), the anion exchange resin as shown in the above formula (13'), the anion exchange resin as shown in the above formula (13"), or the anion exchange resin as shown in the above formula (13''') is obtained.

The ion exchange capacity of the anion exchange resin is, for example, from 0.1 to 4.0 meq./g, and preferably from 0.6 to 3.0 meq./g.

The ion exchange capacity can be calculated by the following equation (24). [ion exchange capacity (meq./g)]=the amount of the ion exchange group introduced per a hydrophilic group x the repeating number of the hydrophilic unit×1000/(the molecular weight of the hydrophobic group x the repeating unit number of the hydrophobic group+ the molecular weight of the hydrophilic group x the repeating unit number of the hydrophilic group+ molecular weight of the ion exchange group x the unit repeating number of the hydrophilic group) (24)

The amount of the ion exchange group introduced is defined as the number of the ion exchange group per a unit of the hydrophilic group. The amount of the anion exchange group introduced is the mole number (mol) of the above-mentioned ion exchange group introduced in the main chain or the side chain of the hydrophilic group.

The anion exchange resin has a hydrophobic group and a hydrophilic group; in which the hydrophobic group is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, or the hydrophobic group is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or direct bond, and in which the plurality of aromatic rings are bonded repeatedly via a divalent hydrocarbon group, a divalent silicon-containing group, a divalent nitrogen-containing group, a divalent phosphorus-containing group, a divalent oxygen-containing group, a divalent sulfur-containing group, or direct bond; in which the hydrophilic group has a quaternary aminoalkyl group; and in which the hydrophobic group and the hydrophilic group are bonded to each other via direct bond. The anion exchange resin has an improved chemical property (durability).

In particular, if the hydrophilic group is repeated via direct bond, the anion exchange resin has no ether bond. Therefore, the anion exchange resin has an improved durability including alkali resistance. More specifically, if the hydrophilic group is repeated via an ether bond, the decomposition by hydroxide ion (OH⁻) as described below may occur, and the anion exchange resin may have insufficient alkali resistance.

[Chemical Formula 81]

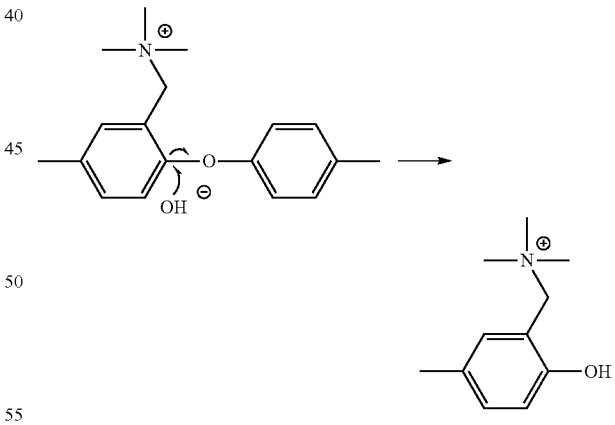

In contrast, in the anion exchange resin having the hydrophilic group which is repeated via direct bond, the decomposition by the mechanism as described above does not occur, and therefore the anion exchange resin has an improved durability including alkali resistance.

In particular, the structure of the hydrophobic moiety having no anion exchange group can be widely selected. Therefore, the structure having an improved physical property (conductivity) and improved chemical stability can be selected as the structure of the hydrophobic moiety regardless of whether the reaction activity is high or not. According to the method as described above, a precursor group of the ion exchange group can be introduced before the polymerization, and thereby the position and the amount of the precursor group introduced can be easily controlled. In addition, the synthesis can be performed without using a reagent with high burden on the environment such as tetrachloroethane or chloromethyl methyl ether.

The present invention includes an electrolyte layer for a fuel cell (an electrolyte membrane for a fuel cell) produced from the anion exchange resin, and a fuel cell having the electrolyte layer for the fuel cell as the electrolyte layer.

FIG. 1 is a schematic configuration diagram showing an embodiment of the fuel cell of the present invention. In FIG. 1, this fuel cell 1 has a cell S for the fuel cell. The cell S for the fuel cell has a fuel side electrode 2, an oxygen side electrode 3, and an electrolyte membrane 4. The fuel side electrode 2 and the oxygen side electrode 3 are oppositely disposed by interposing the electrolyte membrane 4 between them.

As the electrolyte membrane 4, the anion exchange resin as described above can be used. That is, the electrolyte membrane 4 includes the anion exchange resin as described above.

The electrolyte membrane 4 may be reinforced with a reinforcing material known in the art, for example, a porous substrate. Further, the electrolyte membrane 4 may be processed by various procedures including biaxially orientation procedure for controlling the molecular orientation, heat procedure for controlling the crystallinity and the residual stress. A filler known in the art can be added to the electrolyte membrane 4 in order to improve the mechanical strength of the electrolyte membrane 4. The electrolyte membrane 4 and a reinforcing material such as glass unwoven fabric may be pressed to form the complex.

A commonly-used various additive, for example, a compatibilizing agent for improving the compatibility, an antioxidant for preventing the degradation of the resin, and an antistatic agent or a lubricant for improving the handling in forming into the film can be suitably included in the electrolyte membrane 4, as long as the additive does not have an effect on the processability and properties of the electrolyte membrane 4.

The thickness of the electrolyte membrane 4 is not particularly limited, and is suitably selected depending on the purpose and application.

The thickness of the electrolyte membrane 4 is, for example, from 1.2 to 350 μm, and preferably from 5 to 200 μm.

The fuel side electrode 2 is contacted with one surface of the electrolyte membrane 4 so as to be disposed oppositely. For example, the fuel side electrode 2 has the catalyst layer (the fuel cell electrode catalyst layer) in which a catalyst is supported on a porous carrier.

The porous carrier is not particularly limited, and example of the porous carrier includes a water-repellent carrier such as carbon.

The catalyst of the electrode is not particularly limited, and examples of the catalyst include group 8-10 elements in periodic table (according to IUPAC Periodic Table of the Elements (version date 19 Feb. 2010); the same shall apply hereinafter) such as, for example, platinum group elements (Ru, Rh, Pd, Os, Ir, and Pt), and iron group elements (Fe, Co, and Ni); or group 11 elements in periodic table such as, for example, Cu, Ag, and Au, and combination thereof. Preferred examples of the catalyst include Pt (platinum).

For the fuel side electrode 2, for example, the porous carrier and the catalyst are dispersed in an electrolyte solution known in the art to prepare an ink for an electrode. Optionally, the viscosity of the ink for the electrode is then adjusted by blending with a suitable amount of an organic solvent such as alcohols, and the ink for the electrode is applied to one surface of the electrolyte membrane 4 by any method known in the art (for example, spraying method or die coater method), and dried at a determined temperature to produce the fuel side electrode 2 as the thin electrode membrane attached to the surface of the electrolyte membrane 4.

The amount of the catalyst for the electrode supported on the fuel side electrode 2 is not particularly limited, and the amount is, for example, from 0.1 to 10.0 mg/cm$^2$, and preferably from 0.5 to 5.0 mg/cm$^2$.

In the fuel side electrode 2, a fuel to be supplied is reacted with a hydroxide ion (OH$^-$) passed through the electrolyte membrane 4 to form electron (e$^-$) and water (H$_2$O), as described below. For example, when the fuel is hydrogen (H$_2$), only an electron (e$^-$) and water (H$_2$O) are formed. When the fuel is an alcohol, an electron (e$^-$), water (H$_2$O), and carbon dioxide (CO$_2$) are formed. When the fuel is hydrazine (NH$_2$NH$_2$), electron (e$^-$), water (H$_2$O), and nitrogen (N$_2$) are formed.

The oxygen side electrode 3 is contacted with the other surface of the electrolyte membrane 4 so as to be disposed oppositely. For example, the oxygen side electrode 3 has the catalyst layer (the fuel cell electrode catalyst layer) in which a catalyst is supported on a porous carrier.

For the oxygen side electrode 3, for example, the porous carrier and the catalyst are dispersed in an electrolyte solution known in the art to prepare an ink for the electrode. Optionally, the viscosity of the ink for the electrode is then adjusted by blending with a suitable amount of an organic solvent such as alcohols, and the ink for the electrode is applied to the other surface of the electrolyte membrane 4 by any method known in the art (for example, spraying method or die coater method), and dried at a determined temperature to produce the oxygen side electrode 3 as the thin electrode membrane attached to the other surface of the electrolyte membrane 4.

Therefore, the electrolyte membrane 4, the fuel side electrode 2, and the oxygen side electrode 3 form a membrane-electrode assembly by attaching the fuel side electrode 2 in the form of thin membrane to the one surface of the electrolyte membrane 4, and attaching the oxygen side electrode 3 in the form of thin membrane to the other surface of the electrolyte membrane 4.

The amount of the catalyst for the electrode supported on the oxygen side electrode 3 is not particularly limited, and the amount is, for example, from 0.1 to 10.0 mg/cm$^2$, and preferably from 0.5 to 5.0 mg/cm$^2$.

In the oxygen side electrode 3, oxygen (O$_2$) to be supplied, water (H$_2$O) passed through the electrolyte membrane 4, and electron (e$^-$) passed through an external circuit 13 are reacted to form a hydroxide ion (OH$^-$), as described below.

The cell S for the fuel cell further has a fuel supplying member 5 and an oxygen supplying member 6. The fuel supplying member 5 is composed of a gas impermeable conductive member, and one surface of the fuel supplying member 5 is contacted with the fuel side electrode 2 so as to be disposed oppositely. A fuel side path 7 for contacting the fuel with the whole of the fuel side electrode 2 is formed as a winding groove on one surface of the fuel supplying member 5. A supply inlet 8 and an outlet 9 are perforating through the fuel supplying member 5, and the supply inlet 8 and the outlet 9 are continuously formed on the upstream side edge and the downstream side edge of the fuel side path 7, respectively.

The oxygen supplying member 6 is also composed of a gas impermeable conductive member like the fuel supplying member 5, and one surface of the oxygen supplying member 6 is contacted with the oxygen side electrode 3 so as to be disposed oppositely. An oxygen side path 10 for contacting oxygen (air) with the whole of the oxygen side electrode 3 is also formed as a winding groove on one surface of the oxygen supplying member 6. A supply inlet 11 and an outlet 12 are perforating through the oxygen supplying member 6, and the supply inlet 11 and the outlet 12 are continuously formed on the upstream side edge and the downstream side edge of the oxygen side path 10, respectively.

This fuel cell 1 is actually formed as a stack structure in which a plurality of cells S for the fuel cell as described above is layered. Therefore, the fuel supplying member 5 and the oxygen supplying member 6 are actually formed as a separator, and the fuel side path 7 and the oxygen side path 10 are formed on both surfaces of the members.

The fuel cell 1 has a current collector being formed by a conductive member, not shown in the drawings. The electromotive force generated from the fuel cell 1 can be transmitted outwardly through terminals on the current collector.

In FIG. 1, the fuel supplying member 5 and the oxygen supplying member 6 of the cell S for the fuel cell are bonded via the external circuit 13, and a voltmeter 14 is disposed in the external circuit 13 to measure the generated voltage.

In the fuel cell 1, the fuel is supplied to the fuel side electrode 2 directly without the reforming process, or after the reforming process.

Examples of the fuel include a hydrogen-containing fuel.

The hydrogen-containing fuel is a fuel having hydrogen atom in the molecule. Examples of the hydrogen-containing fuel include hydrogen gas, alcohols, and hydrazines. Preferred examples of the hydrogen-containing fuel include hydrogen gas and hydrazines.

Specific examples of hydrazines include hydrazine ($NH_2NH_2$), hydrated hydrazine ($NH_2NH_2·H_2O$), hydrazine carbonate (($NH_2NH_2)_2CO_2$), hydrazine hydrochloride ($NH_2NH_2·HCl$), hydrazine sulfate ($NH_2NH_2·H_2SO_4$), monomethylhydrazine ($CH_3NHNH_2$), dimethylhydrazine (($CH_3)_2NNH_2$, $CH_3NHNHCH_3$), and carbonhydrazide (($NHNH_2)_2CO$). The listed fuel may be used alone or in combination with two or more kinds.

Among these fuel compounds, carbon-free compounds, i.e., hydrazine, hydrated hydrazine, and hydrazine sulfate do not generate CO and $CO_2$, and do not occur the catalyst poisoning. Therefore, the compounds have an improved durability, and zero-emission can be substantially accomplished.

Although the listed fuel may be used as it is, the listed fuel compound can be used as a solution in water and/or an alcohol (for example, a lower alcohol such as methanol, ethanol, propanol, or isopropanol). In this case, the concentration of the fuel compound in the solution varies depending on the type of the fuel compound, for example, from 1 to 90 mass %, and preferably from 1 to 30 mass %. The listed solvent may be used alone or in combination with two or more kinds.

Further, the listed fuel compound can be used in the form of gas (for example, steam).

By supplying the fuel to the fuel side path 7 of the fuel supplying member 5 while supplying oxygen (air) to the oxygen side path 10 of the oxygen supplying member 6, on the oxygen side electrode 3, an electron ($e^-$) generated in the fuel side electrode 2 and passed through the external circuit 13, water ($H_2O$) generated in the fuel side electrode 2, and oxygen ($O_2$) are reacted to form a hydroxide ion ($OH^-$), as described below. The formed hydroxide ion ($OH^-$) is moved from the oxygen side electrode 3 to the fuel side electrode 2 in the electrolyte membrane 4 being composed of an anion exchange membrane. On the fuel side electrode 2, a hydroxide ion ($OH^-$) passed through the electrolyte membrane 4 and the fuel are reacted to form an electron ($e^-$) and water ($H_2O$). The formed electron ($e^-$) is moved from the fuel supplying member 5 to the oxygen supplying member 6 via the external circuit 13, and supplied to the oxygen side electrode 3. The formed water ($H_2O$) is moved from the fuel side electrode 2 to the oxygen side electrode 3 in the electrolyte membrane 4. The electromotive force was generated by electrochemical reaction on the fuel side electrode 2 and the oxygen side electrode 3 to produce electricity.

Although the operating condition of the fuel cell 1 is not particularly limited, for example, the condition in which the applied pressure on the fuel side electrode 2 is 200 kPa or less, and preferably 100 kPa or less, the applied pressure on the oxygen side electrode 3 is 200 kPa or less, and preferably 100 kPa or less, and the temperature of the cell S for the fuel cell is from 0 to 120° C., and preferably from 20 to 80° C. is selected.

In the fuel cell 1, the electrolyte membrane for a fuel cell having the anion exchange resin having an improved durability as described above is used in the electrolyte membrane 4.

Therefore, the electrolyte membrane for a fuel cell of the present invention obtained by using the anion exchange resin of the present invention, and the fuel cell having the electrolyte membrane for a fuel cell have an improved durability.

The present invention also includes a binder for forming the electrode catalyst layer having the anion exchange resin as described above, an electrode catalyst layer for the fuel cell having the binder for forming the electrode catalyst layer, and the fuel cell having the electrolyte layer for the fuel cell.

Thus, in the fuel cell 1, the anion exchange resin can be included in the binder for forming the electrode catalyst layer during the formation of the fuel side electrode 2 and/or the oxygen side electrode 3.

Specifically, as the method for including the anion exchange resin in the binder for forming an electrode catalyst layer, for example, the binder for forming the electrode catalyst layer is prepared by cutting the anion exchange resin into pieces, and then dissolving the resin in a suitable amount of an organic solvent such as alcohols.

In the binder for forming the electrode catalyst layer, the amount of the anion exchange resin is, for example, from 2 to 10 parts by weight, and preferably from 2 to 5 parts by weight with respect to 100 parts by weight of the binder for forming the electrode catalyst layer.

By using the binder for forming an electrode catalyst layer for the formation of the catalyst layer (the fuel cell electrode catalyst layer) of the fuel side electrode 2 and/or the oxygen side electrode 3, the catalyst layer (the fuel cell electrode catalyst layer) can have the anion exchange resin. Therefore, the fuel cell 1 having the catalyst layer (the fuel cell electrode catalyst layer) including the anion exchange resin can be obtained.

In the fuel cell 1, the binder for forming the electrode catalyst layer including the anion exchange resin having an improve durability as described above is used for the formation of the fuel cell electrode catalyst layer.

Therefore, the binder for forming the electrode catalyst layer of the present invention obtained by using the anion exchange resin of the present invention, and the fuel cell electrode catalyst layer obtained by using the binder for forming the electrode catalyst layer can have an improved durability and an improved anion conductivity.

As a result, the fuel cell having the fuel cell electrode catalyst layer can have an improved durability and an improved anion conductivity.

Although exemplary embodiments of the present invention have been described hereinabove, the embodiments of the present invention are not limited to these embodiments, but may be suitably modified by those skilled in the art without departing from the scope of the invention.

Exemplary applications of the fuel cell of the present invention includes power supplies of drive motors for automobiles, marine vessels, or aircrafts; and power supplies for communication terminals including mobile phones.

Example

Although the present invention is described based on the Example and the Comparative Example, the present invention is not limited to the following Example.

Example

<Synthesis of First Oligomer>

To a 100 mL three-necked round-shaped flask equipped with a nitrogen inlet and a Dean Stark trap were added 4,4'-dichlorodiphenyl sulfone (16.0 g, 55.6 mmol), 4,4-dihydroxybenzophenone (9.52 g, 44.4 mmol), potassium carbonate (15.4 g, 111 mmol), N,N-dimethylacetamide (140 ml), and toluene (48 ml). After stirring the mixture to dissolve 4,4'-dichlorodiphenyl sulfone and 4,4-dihydroxybenzophenone, the mixture was heated to 170° C. and was dehydrated for 4 hours by azeotropy with toluene.

After dehydration, toluene in the Dean Stark trap was removed, and then toluene was removed from the mixture by trapping the refluxed toluene. The mixture was then reacted for further 27 hours.

At this time, 4,4'-dichlorodiphenyl sulfone (1.60 g, 5.57 mmol) was added as an end-capping agent, and was then reacted for further 1 hour.

The reaction was quenched by adding the reaction mixture dropwise in pure water to precipitate the product. The product was filtered and collected, and was washed with hot water and hot methanol several times. After that, the product was dried overnight at 80° C. under vacuum.

From the reaction, the first oligomer having white color as shown in the following formula (q=5) was obtained in a yield of 94%.

[Chemical Formula 82]

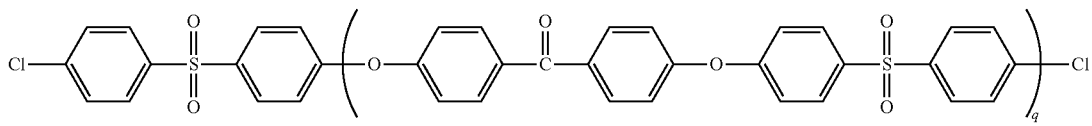

<Synthesis of Aminomethyl Group-Containing Monomer>
(Amidation Reaction of Carboxylic Acid)

To a 500 mL one-necked flask were added 22.4 g (117 mmol) of 2,5-dichlorobenzoic acid and 200 mL of dichloromethane to form a suspension. After that, a mixture of 16.8 g (132 mmol) of oxalyl chloride and 66 mL of dichloromethane were added to the suspension dropwise slowly. Then, 10 drops of N,N-dimethylformamide was added, and the resultant mixture was stirred at room temperature for 6 hours.

1H NMR was measured using a portion of the reaction solution. After confirmed the loss of the starting materials, 18.9 g (232 mmol) of dimethyl amine hydrochloride and 50 mL (358 mL) of triethylamine were added slowly, and the resultant mixture was stirred at room temperature for 24 hours.

To the reaction solution was added pure water. The aqueous phase was extracted with dichloromethane. The combined organic phase was washed with 1 M hydrochloric acid, saturated sodium bicarbonate solution, and pure water. The solvent was distilled off under reduced pressure. To the resulting residue was added hexane to precipitate a white solid. The precipitate was collected by filtration, and was washed with hexane. After that, the precipitate was dried at 80° C. under vacuum.

From the reaction, 2,5-dichloro-N,N-dimethylbenzamide having pale brown color as shown in the following formula was obtained in a yield of 93%.

[Chemical Formula 83]

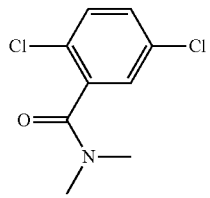

(Reduction Reaction of Amide)

To a one-necked flask equipped with a nitrogen inlet and a condenser were added 4.14 g (109 mmol) of lithium aluminum hydride and 250 mL of tetrahydrofuran to form a suspension. After that, a mixture of 23.8 g (109 mmol) of 2,5-dichloro-N,N-dimethylbenzamide and 90 mL of tetrahydrofuran was added to the suspension dropwise slowly. The resultant mixture was refluxed for 26 hours.

1H NMR was measured using a portion of the reaction solution and the loss of the starting materials and the formation of the product were confirmed. After leaving the solution until the temperature reaches to room temperature, 4 mL of pure water, 4 mL of 15% aqueous sodium hydroxide, and then 20 mL of pure water were added.

After removing insolubles in the solution by filtration, the filtrate was distilled off under reduced pressure. The residue was then purified by column chromatography on silica gel (hexane:ethyl acetate=9:1).

From the reaction, colorless and transparent 2,5-dichloro-N,N-dimethylbenzylamine as shown in the following formula was obtained in a yield of 77%.

[Chemical Formula 84]

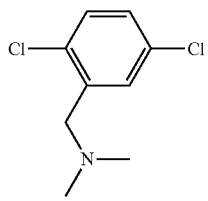

<Synthesis of Precursor Polymer for Anion Exchange Resin>

To a 100 mL three-necked round-shaped flask equipped with a nitrogen inlet, a mechanical stirrer and a condenser were added the first oligomer (482 mg, 0.123 mmol), 2,5-dichloro-N,N-dimethylbenzylamine (311 mg, 1.52 mmol), 2,2-bipyridine (600 mg, 3.84 mmol), N,N-dimethylacetamide (10 ml), and toluene (5 mL). The resultant mixture was heated to 170° C. and was dehydrated for 2 hours by azeotropy with toluene.

After dehydration, toluene in the Dean Stark trap was removed, and then toluene was removed from the mixture by trapping the refluxed toluene. After leaving the mixture until the temperature reaches to 80° C., bis(1,5-cyclooctadiene) nickel (0) (1.00 g, 3.64 mmol) was added to the mixture, and was reacted at 80° C. for 19 hours.

The reaction was quenched by adding the reaction mixture dropwise in hydrochloric acid to precipitate the product. The product was filtered and collected, and was washed with pure water, aqueous potassium carbonate, pure water, and methanol several times. After that, the product was dried overnight at 80° C. under vacuum.

From the reaction, the precursor polymer of the anion exchange resin having pale yellow color as shown in the following formula (q=5, l=1, m=8) was obtained in a yield of 84%.

[Chemical Formula 85]

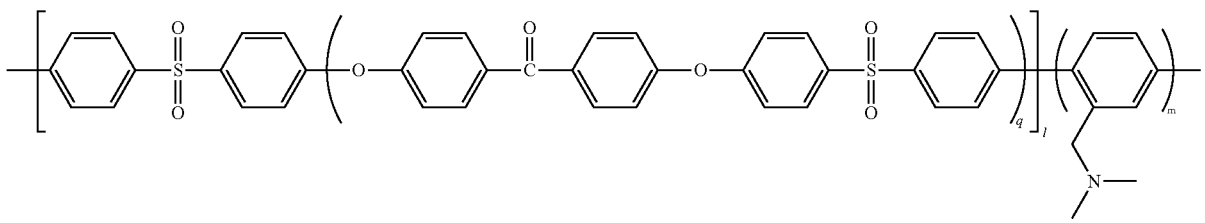

<Quaternizing Reaction>

To a 50 mL glass reactor were added the precursor polymer of the anion exchange resin (359 g) and N,N-dimethylacetamide (3.5 mL). After stirring the mixture and dissolving the precursor polymer of the anion exchange resin, methyl iodide (249 µL, 5.00 mmol) was added, and the resultant mixture was stirred at room temperature for 48 hours.

After adding N,N-dimethylacetamide (3 mL) to the reaction mixture, the reaction was quenched by adding the reaction mixture dropwise in pure water to precipitate the product. The product was filtered and collected, and was washed with pure water several times. After that the product was dried overnight at 60° C. under vacuum.

From the reaction, the anion exchange resin having orange color as shown in the following formula (q=5, l=1, m=5) was obtained.

[Chemical Formula 86]

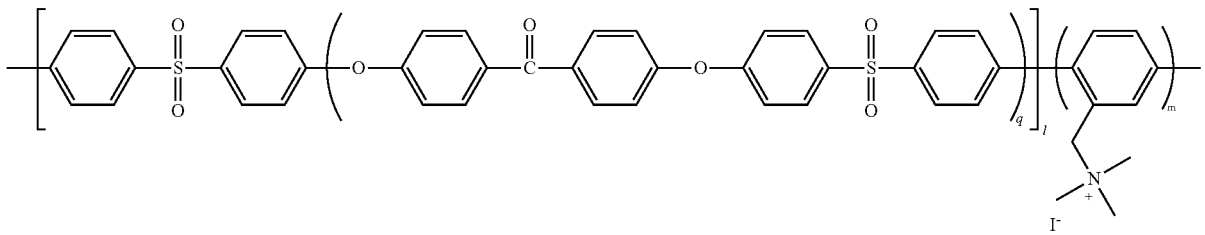

<Formation of Membrane>

The anion exchange resin was formed into the membrane by solution casting method.

That is, the anion exchange resin (0.30 g) was dissolved in dimethyl sulfoxide (3 mL), and filtered through a glass filter (G3). The filtrate was passed through a glass plate wound with silicone rubber, and kept it on a hot plate adjusted so as to be oriented horizontally at 50° C., and dried to obtain a transparent brown colored membrane.

<Ion Exchange>

Since the membrane has an iodide ion as the counter ion of the ion exchange group (quaternary ammonium group), the membrane was changed into the form of hydroxide by immersing it in 1 mol/L if aqueous potassium hydroxide for 2 days and washing with degassed pure water.

Comparative Example

<Synthesis of First Oligomer>

To a 100 mL three-necked round-shaped flask equipped with a nitrogen inlet and a Dean Stark trap were added hexafluorobisphenol A (2,2-bis(4-hydroxyphenyl)hexafluoropropane) (3.36 g, 10.0 mmol), potassium carbonate (2.07 g, 15.0 mmol), N,N-dimethylacetamide (23 ml), and toluene (5 ml). After stirring the mixture to dissolve hexafluorobisphenol A, the mixture was heated to 150° C. and was dehydrated for 3 hours by azeotropy with toluene.

After dehydration, toluene in the Dean Stark trap was removed, and then toluene was removed in the mixture by trapping the refluxed toluene. After that, the mixture was then left until the temperature reaches to room temperature. Decafluorobiphenyl (4.18 g, 12.5 mmol) was added to the mixture, and the resultant mixture was heated to 60° C. and was then reacted for 2 hours.

At this time, decafluorobiphenyl (0.42 g, 1.3 mmol) was added as an end-capping agent, and then reacted for further 1 hour.

The reaction was quenched by adding the reaction mixture dropwise in hot water to precipitate the product. The product was filtered and collected, and was washed with hot water and hot methanol several times. After that, the product was dried overnight at 60° C. under vacuum.

From the reaction, the first oligomer having white color as shown in the following formula (x=6) was obtained in a yield of 87%.

[Chemical Formula 87]

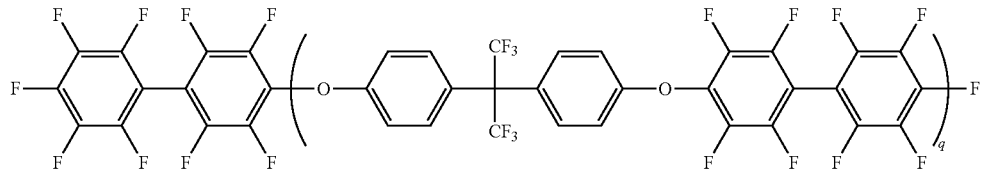

<Synthesis of Second Oligomer>

To a 100 mL three-necked round-shaped flask equipped with a nitrogen inlet were added the first oligomer (3.00 g, 0.893 mmol), 4-chlorophenol (0.29 g, 2.2 mmol), potassium carbonate (0.43 g, 3.0 mmol), and N,N-dimethylacetamide (30 ml). After stirring the mixture to dissolve the first oligomer and 4-chlorophenol, the mixture was heated to 40° C. and reacted for 3 hours.

The reaction was quenched by adding the reaction mixture dropwise in pure water to precipitate the product. The product was filtered and collected, and was washed with pure water and methanol several times. After that, the product was dried overnight at 60° C. under vacuum.

From the reaction, the second oligomer having white color as shown in the following formula (x=6) was obtained in a yield of 87%.

[Chemical Formula 88]

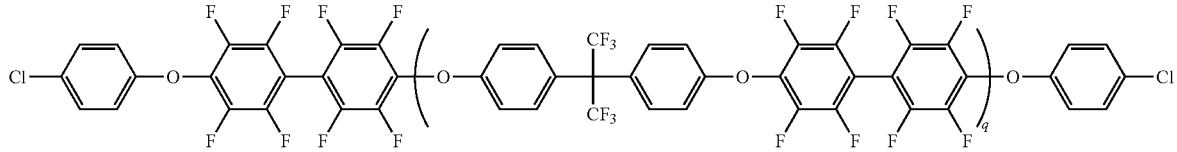

<Synthesis of Precursor Polymer for Anion Exchange Resin>

To a 100 mL three-necked round-shaped flask equipped with a nitrogen inlet, a mechanical stirrer and a condenser were added the second oligomer (0.60 g, 0.14 mmol), 1,4-dichlorobenzene (0.04 g, 0.3 mmol), 1,3-dichlorobenzene (0.16 g, 1.1 mmol), 2,2'-bipyridine (0.57 g, 3.6 mmol), bis(1,5-cyclooctadiene)nickel (0) (1.00 g, 3.60 mmol), and N,N-dimethylacetamide (10 ml). After stirring the mixture to dissolve the second oligomer, 1,4-dichlorobenzene and 1,3-dichlorobenzene, the mixture was heated to 80° C. and reacted for 3 hours.

The reaction was quenched by adding the reaction mixture dropwise in hydrochloric acid to precipitate the product. The product was filtered and collected, and was washed with pure water and methanol several times. After that, the product was dried overnight at 60° C. under vacuum.

From the reaction, the precursor polymer of the anion exchange resin having white color as shown in the following formula (q=6, l=1, m=2, n=8) was obtained in a yield of 92%.

[Chemical Formula 89]

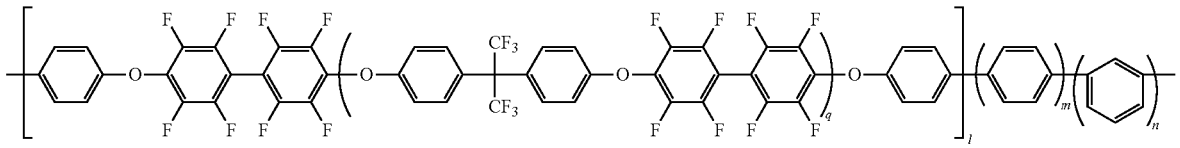

<Introduction of Anion Exchange Group>

(Chloromethylation Reaction)

To a 100 mL of glass reactor were added the precursor polymer for anion exchange resin (0.60 g) and 1,1,2,2-tetrachloroethane (27 ml). After stirring the mixture to dissolve the precursor polymer for anion exchange resin, in a glove box under argon, chloromethyl methyl ether (16 ml), and zinc chloride (0.5 mol/L solution in tetrahydrofuran) (3 ml) were added and reacted at 80° C. for 5 days.

The reaction was quenched by adding the reaction mixture dropwise in methanol to precipitate the product. The product was filtered and collected, and was washed with methanol several times. After that, the product was dried overnight at 60° C. under vacuum.

From the reaction, the precursor polymer for anion exchange resin was chloromethylated.

[Chemical Formula 90]

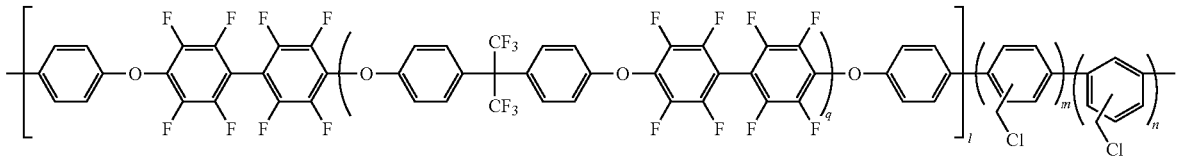

(Formation of Membrane)

The chloromethylated precursor polymer for anion exchange resin was formed into the membrane by solution casting method.

That is, the chloromethylated precursor polymer for anion exchange resin (0.5 g) was dissolved in 1,1,2,2-tetrachloroethane (5 ml), and filtered through a glass filter (G3). The filtrate was passed through a glass plate wound with silicone rubber, and kept it on a hot plate adjusted so as to be oriented horizontally at 50° C., and dried to obtain a transparent membrane.

(Quaternizing Reaction)

The membrane of the chloromethylated precursor polymer for anion exchange resin was immersed in 45 mass % solution of trimethylamine in water for 2 days, and quaternized the polymer to obtain a transparent membrane of the anion exchange resin.

[Chemical Formula 91]

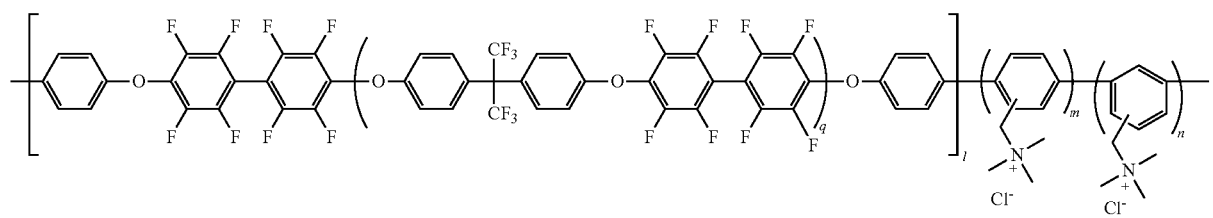

<Ion Exchange>

Since the membrane has an iodide ion as the counter ion of the ion exchange group (quaternary ammonium group), the membrane was changed into the form of hydroxide by immersing it in 1 mol/L if aqueous potassium hydroxide for 2 days and washing with degassed pure water.

<<Evaluation>>

<Measurement of Hydroxide Ion Conductivity>

The hydroxide ion conductivities of the anion exchange membranes as described above were measured. The measurement was performed by an alternating current four-terminal method (300 mV, 10-100000 Hz) in water at 30° C. The measuring instrument used was Solartolon 1255B/1287, and a gold wire having a diameter of 1 mm was used as a probe. The resulting anion exchange membrane was cut into a piece having a width of 1 cm to produce a measured sample, and the sample was fixed at a distance between probes of 1 cm. The hydroxide ion conductivity a (S/cm) at each temperature as described above was calculated by the following equation from the distance between probes (1 cm), the impedance Z (Ω), and the cross-sectional area of the membrane A (cm2).

$\sigma = (L/Z) \times 1/A$

Figure 2:
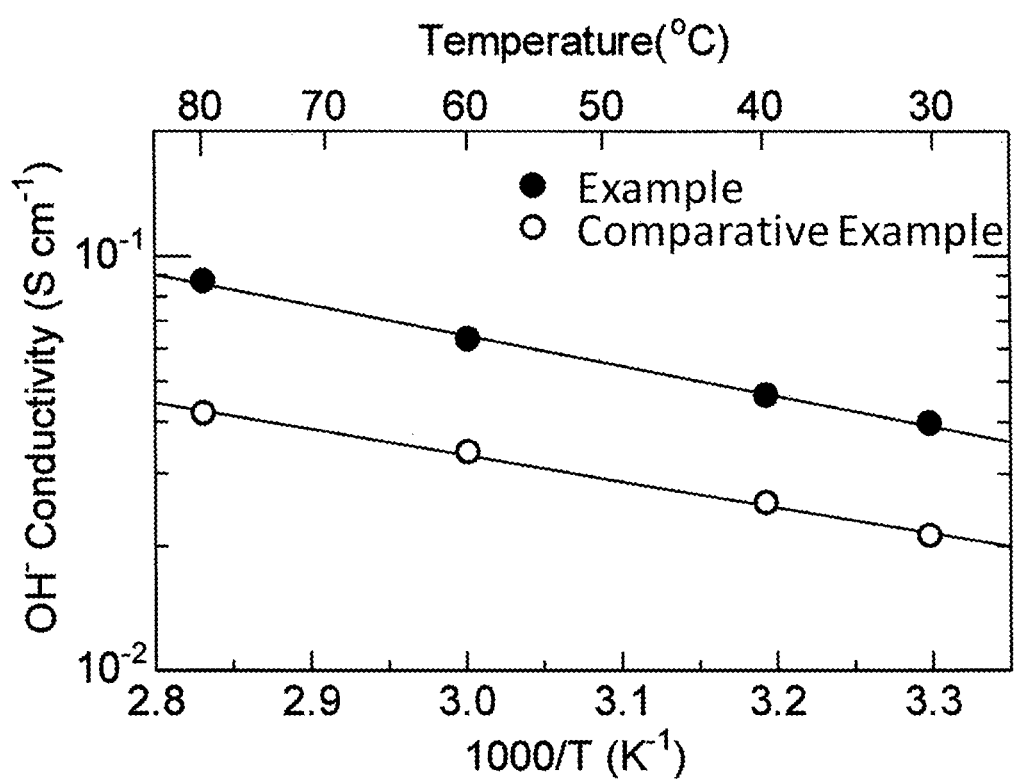
FIG. 2 shows data obtained by measuring the ion conductivity of hydroxide ion in the anion exchange resins produced in Example and Comparative Example.

The results are shown in FIG. 2. The membrane of the anion exchange resin obtained in the Example showed higher hydroxide ion conductivity than that of the anion exchange resin obtained in the Comparative Example, although the membrane of the anion exchange resin obtained in the Example has lower IEC than that of the anion exchange resin obtained in the Comparative Example.

DENOTATION OF REFERENCE NUMERALS 1 fuel cell
2 fuel side electrode
3 oxygen side electrode
4 electrolyte membrane
S cell for the fuel cell

What is claimed is:

1. A method for producing an anion exchange resin, comprising:
   (A) preparing a hydrophobic monomer or a hydrophobic oligomer,
      wherein the hydrophobic monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or a carbon-carbon bond, and wherein the aromatic ring(s) are substituted with two halogen atoms, pseudohalides or boronate groups; and
      wherein the hydrophobic oligomer is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or a carbon-carbon bond, wherein the plurality of aromatic rings are bonded repeatedly via a divalent hydrocarbon group, a divalent silicon-containing group, a divalent nitrogen-containing group, a divalent phosphorus-containing group, a divalent oxygen-containing group, a divalent sulfur-containing group, or a carbon-carbon bond, and wherein the aromatic rings are substituted at both terminals with two halogen atoms, pseudohalides or boronate groups;
   (B) preparing an aminoalkyl group-containing monomer, wherein the aminoalkyl group-containing monomer is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or a carbon-carbon bond, and wherein the aromatic ring(s) are substituted with two halogen atoms, pseudohalides or boronate groups, and wherein at least one aromatic ring has an aminoalkyl group;
   (C) reacting the hydrophobic monomer or the hydrophobic oligomer with the aminoalkyl group-containing monomer to synthesize a polymer; and
   (D) quaternizing the amino group in the polymer;
   in the anion exchange resin,
   wherein the residue of the hydrophobic monomer or the hydrophobic oligomer forms a divalent hydrophobic group;
   wherein the quaternized amino group forms an anion exchange group;
   wherein the residue of the quaternized aminoalkyl group-containing monomer forms a divalent hydrophilic group; and
   wherein the divalent hydrophobic group and the divalent hydrophilic group are bonded via a carbon-carbon bond.

* * * * *